United States Patent [19]
Sawada et al.

[11] Patent Number: 5,365,700
[45] Date of Patent: Nov. 22, 1994

[54] APPARATUS AND METHOD FOR PRODUCING MAGNETIC HEAD SLIDERS

[75] Inventors: Shigetomo Sawada; Yoshimichi Asanai; Yoshio Tanaka; Kikuo Yashiro, all of Kawasaki, Japan

[73] Assignee: Fujitsu Limited, Kawasaki, Japan

[21] Appl. No.: 165,578

[22] Filed: Dec. 13, 1993

Related U.S. Application Data

[63] Continuation of Ser. No. 891,204, Jun. 1, 1992, abandoned.

[30] Foreign Application Priority Data

Jun. 4, 1991 [JP]  Japan .................................. 3-133054

[51] Int. Cl.[5] ........................... B24B 1/00; B24B 7/04
[52] U.S. Cl. ........................................ 451/28; 451/287; 451/288; 451/289; 451/398; 451/41
[58] Field of Search ................. 51/131.1, 131.3, 131.4, 51/131.5, 132, 281 R, 317, 216 T, 237 R, 123 R, 283 R

[56] References Cited

U.S. PATENT DOCUMENTS

| | | | |
|---|---|---|---|
| 3,453,783 | 7/1969 | Queen | 51/237 R |
| 3,685,216 | 8/1972 | Frey | 51/324 |
| 4,009,540 | 3/1977 | Johannes . | |
| 4,239,567 | 12/1980 | Winings | 51/237 R |

FOREIGN PATENT DOCUMENTS 0077651  4/1988  Japan .................................. 51/131.4

*Primary Examiner*—Jack W. Lavinder
*Attorney, Agent, or Firm*—Armstrong, Westerman, Hattori, McLeland & Naughton

[57] ABSTRACT

A magnetic head slider producing apparatus includes a rotary lapping member having a lapping surface, a work member having a surface, and an elastic member fastened to the surface of the work member. The elastic member has [adhesion properties] adhesive characteristics. Magnetic head sliders each have a back surface, and rail surfaces in which magnetic heads are embedded. The back surface of each of the magnetic head sliders is in contact with the elastic member, and the magnetic head sliders are adhesively held by the elastic member [due to the adhesion thereof]. The work member is positioned so that the rail surface of each of the magnetic head sliders comes into contact with the lapping surface of the rotary lapping member.

61 Claims, 26 Drawing Sheets

FIG. 4A
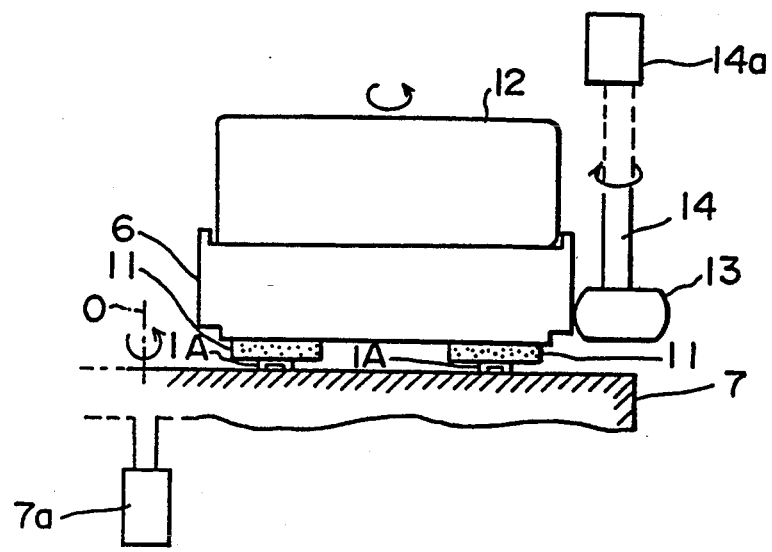
FIG. 4B(a) FIG. 4B(b)
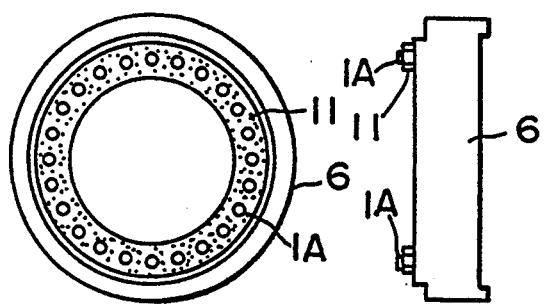
FIG. 4C FIG. 4D
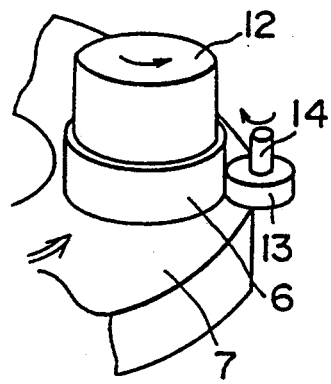 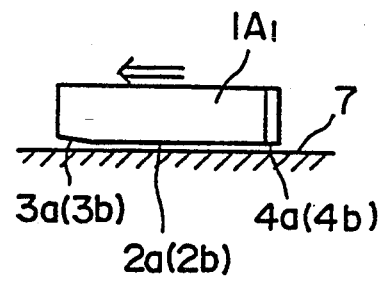

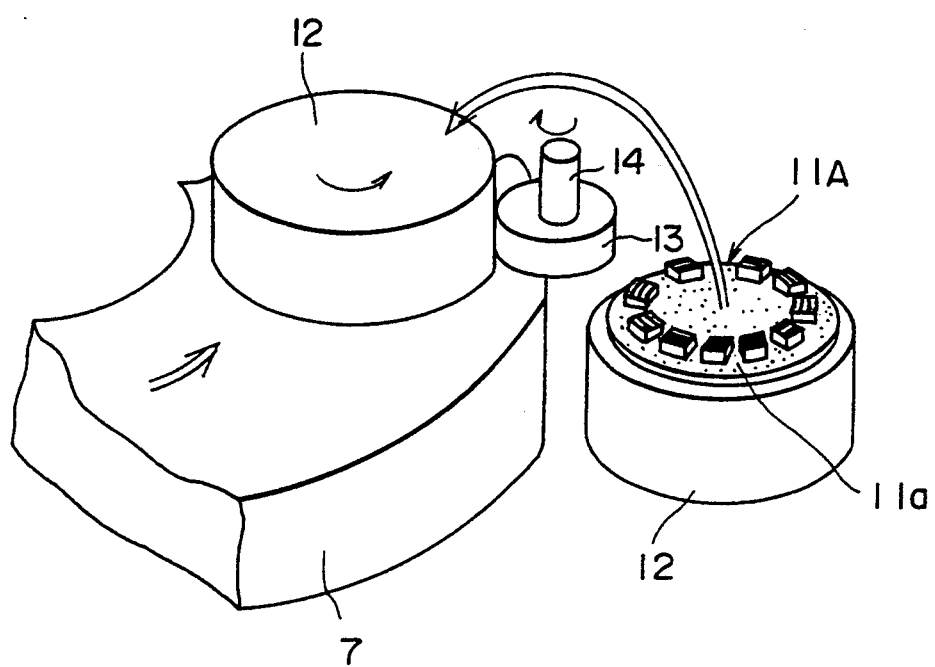
F I G. 5

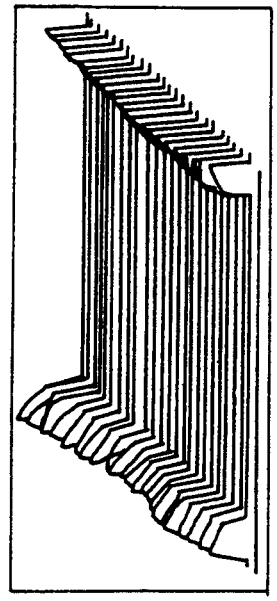
FIG. 15A
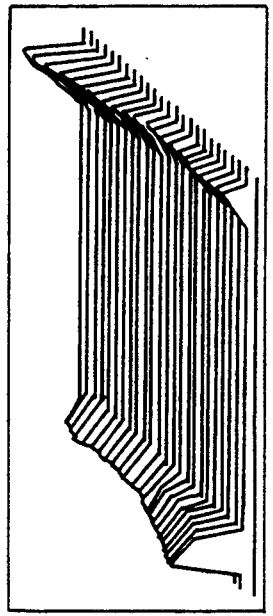
FIG. 15C
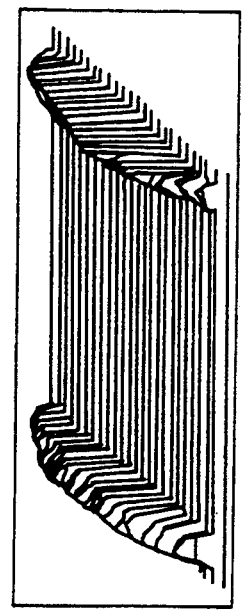
FIG. 15B   PV VALUE 18.5nm   CROWN -1.3nm
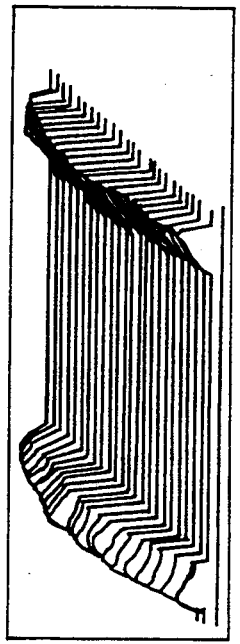
FIG. 15D   PV VALUE 18.5nm   CROWN 10.5nm

SILICON RUBBER

AFTER MECHANICAL
LAPPING FINISHING

MEASURED PORTION A

AFTER PROCESSING
100 LOTS

MEASURED PORTION B

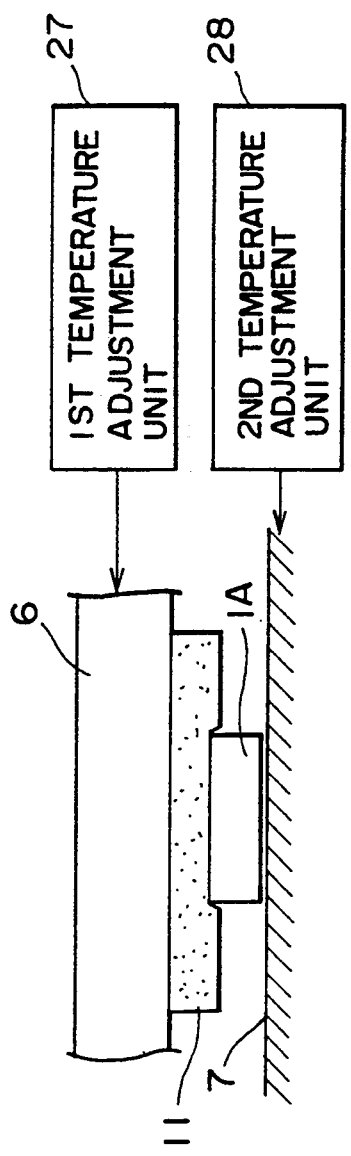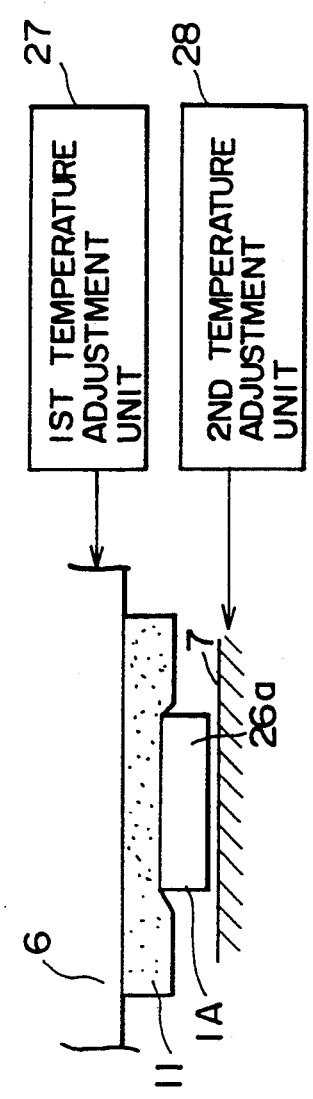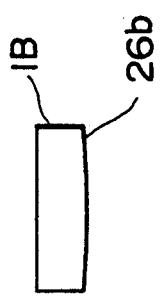
FIG. 21A
FIG. 21B
FIG. 21C

APPARATUS AND METHOD FOR PRODUCING MAGNETIC HEAD SLIDERS

This application is a continuation of application Ser. No. 07/891,204 filed Jun. 1, 1992, now abandoned.

BACKGROUND OF THE INVENTION

1. Field of the Invention

The present invention generally relates to magnetic head sliders in which magnetic heads are embedded, and more particularly to an apparatus and method for producing magnetic head sliders.

2. Description of the Related Art

A magnetic hard disk unit is widely used as an external storage unit. The magnetic hard disk unit includes a plurality of magnetic head sliders in which a plurality of heads are embedded. The magnetic head sliders fly over magnetic disks which are rotating. Recently it has been required that the flying height of the magnetic head sliders be reduced in order to improve sensitivity of the magnetic heads. For this requirement, it is necessary to form the slider surfaces so that they have a flatness less than or equal to 1/30 $\mu$m. The magnetic head sliders start to take off from the magnetic disks and fly when enabled, and come into contact with the magnetic disks when disabled. The above-mentioned magnetic head sliders are called contact start stop type (hereinafter simply referred to as a CSS type) magnetic head sliders. In the CSS type magnetic head sliders, it is desired that the magnetic heads be prevented from being damaged during takeoff and landing.

FIG. 1A is a perspective view of a first conventional magnetic head slider 1A. The magnetic head slider 1A shown in FIG. 1A includes two flat rail (slider) surfaces 2a and 2b. Taper portions 3a and 3b are formed in leading ends (air incoming side) of the rail surfaces 2a and 2b, respectively. As shown in FIG. 1C, two thin film magnetic heads 4a and 4b are embedded in trailing end portions (air outgoing side) of the rail surfaces 2a and 2b, respectively. It is desired that each of the rail surfaces 2a and 2b has a flatness less than or equal to 1/30 $\mu$m in order to minimize the distance between the rail surfaces 2a and 2b and a recording surface of the magnetic disk. The tapered portions 3a and 3b may be omitted, and one of the two magnetic heads may be omitted.

FIG. 1B is a perspective view of a second conventional magnetic head slider 1B. It is required to reduce friction between the magnetic head slider 1B and the magnetic disk and wearing thereof and to reduce the possibility that a head may be crushed. In order to meet the above requirements, rail surfaces 5a and 5b of the magnetic head slider 1B are formed into a convex shape. Such convex surfaces are called crown shapes. It is desired that a crown quantity (difference of elevation), which can be expressed by the difference between the lowest level (reference level) and the highest level on the crown surface, be equal to or larger than 10–20 nm.

The actual rail surfaces of many of the sliders produced have errors in flatness due to twists or negative crown shapes. These poor shapes of the rail surfaces are mainly due to imbalance in the stress between the front and back surfaces of the sliders caused by mechanical processing. In order to obtain the rail surfaces having desired shapes, it is necessary to perform a process for correcting the rail surfaces.

As will be described in detail later, the present invention is intended to efficiently and effectively process the rail surfaces of sliders, so that desired ideal shapes of the rail surfaces can be obtained. The ideal shapes means that the rail surfaces has a good flatness (a PV (peak-to-valley) value of 30 nm or less) and a crown quantity equal to or greater than 10 nm, a small recession of a magnetic pole (also referred to as a recess quantity) (equal to or less than about 20 nm) and a small gap depth (0.5–1.5 $\mu$m).

A conventional process for correcting the deformed rail surfaces of the sliders will now be described below with reference to FIGS. 2 and 3.

FIG. 2 is a diagram showing a conventional slider production process. Back surfaces of a plurality of magnetic head sliders 1A are fastened, by means of an adhesive, to a work member 6 made of a rigid member, and the flat rail surfaces 2a and 2b of the sliders 1A are placed on a ring-shaped lapping base 7. A predetermined pressure is vertically applied to the work member 6 is means of a weight or the like. In this state, the lapping plate 7 is rotated around an axis O in a direction indicated by an arrow while the work member 6 is rotated in a direction indicated by another arrow.

However, it should be noted that the thicknesses of the sliders 1A are slightly different from each other and that the sliders 1A are fastened to the work member 6 by means of an adhesive. Hence, the work member 6 having a great thickness is preferentially processed and the processing quantities of the respective sliders produced are different from each other. As a result, it is impossible to uniformly correct the rail surfaces of a large number of sliders.

Conventionally, as shown in FIG. 3, the sliders are manually polished one by one. However, in this manual lapping process, it is very difficult to obtain the desired crown-shaped rail surfaces. Hence, it is impossible to,- ,efficiently and effectively produce a large number of sliders having the desired crown-shaped rail surfaces.

It will be noted that a gap depth D shown in FIG. 1C is as small as possible in order to increase the recording density. However, it is impossible to finely adjust the gap depth D by means of the conventional techniques as shown in FIG. 2 or FIG. 3.

SUMMARY OF THE INVENTION

It is an object of the present invention to provide a method and apparatus capable of mechanically producing a large number of magnetic head sliders having desired flat or crown-shaped rail surfaces, a desired gap depth and a small recession of a magnetic pole.

This object of the present invention is achieved by a magnetic head slider producing apparatus comprising: a rotary lapping member having a lapping surface: a work member having a flat surface; and an elastic member fastened to the flat surface of the work member, the elastics member having adhesion or adhesiveness, magnetic head sliders each having a back surface, and rail surfaces in which magnetic heads are embedded, the back surface of each of the magnetic head sliders being in contact with the elastic member, and the magnetic head sliders being held by the elastic member due to the adhesion thereof, and the work member being positioned so that the rail surface of each of the magnetic head sliders comes in contact with the lapping surface of the rotary lapping member.

The above-mentioned object of the present invention is also achieved by a magnetic head slider producing method comprising the steps of: (a) rotating a rotary lapping member having a lapping surface; and (b) moving a work member having a flat surface. An elastic member is fastened to the flat surface of the rotary work member, and has adhesion. Magnetic head sliders each have a back surface, and rail surfaces in which magnetic heads are embedded. The back surface of each of the magnetic head sliders is in contact with the elastic member. The magnetic head sliders are held by the elastic member due to the adhesion thereof. The work member is positioned so that the rail surface of each of the magnetic head sliders comes in contact with the lapping surface of the rotary lapping member.

BRIEF DESCRIPTION OF THE DRAWINGS

Other objects, features and advantages of the present invention will become more apparent from the following detailed description when read in conjunction with the accompanying drawings, in which:

FIGS. 4A, 4B, 4C and 4D are diagrams showing a first embodiment of the present invention;

FIG. 5 is a perspective view of a variation of the first embodiment of the present invention;

FIGS. 15A, 15B, 15C and 15D are diagrams showing experimental results;

FIGS. 21A, 21B and 21C are diagrams showing a fourth embodiment of the present invention;

DESCRIPTION OF THE PREFERRED EMBODIMENTS

Figure 1A:
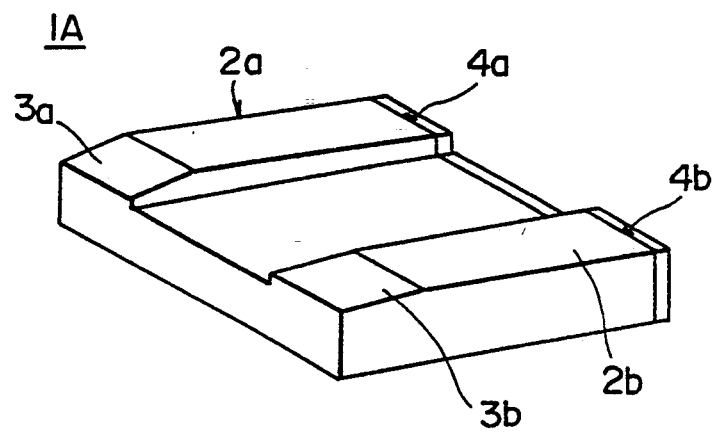
FIG. 1A is a perspective view of a first conventional magnetic head slider.

A description will now be given, with reference to FIGS. 4A through 4C, of a first embodiment of the present invention. In FIGS. 4A through 4C, parts which are the same as those shown in the previously described figures are given the same reference numerals.

Referring to FIG. 4A, a magnetic head slider production apparatus 10 includes the work member (rigid body) 6, the lapping plate 7, a rubber sheet 11, a pressure member 12, a rotation transferring member 13 and a rotating shaft 14. The work member 6 has a cylindrical shape, and has a flat surface. The rubber member 11 has a ring shape and is fixed to the flat surface of the cylindrical work member 6 by an adhesive. As shown in FIG. 4B, a plurality of magnetic head sliders 1A are attached to the rubber member 11 and arranged in a circle at fixed intervals so that the back surfaces of the sliders 1A are adhesively held by the rubber member 11. As shown in FIG. 1A, each of the sliders 1A includes the rail surfaces 2a and 2b having the tapered portions 3a and 3b, and the magnetic heads 4a and 4b. The rail surfaces 2a and 2b of the sliders 1A are placed on the ring-shaped lapping plate 7, which has a lapping surface having a predetermined roughness. In this case, the sliders 1A are located so that the tapered portions 3a and 3b serve as leading ends in the direction of motion of the sliders 1A in the rotating direction of the work member 6, as shown in FIG. 4D.

The pressure member 12 is placed on the work member 6. The rotation transferring member 13, which is a roller made of rubber, comes in contact with the work member 6. The rotation transferring member 13 is rotated via the shaft 14, which is driven by a motor 14a.

As shown in FIGS. 4A and 4C, the lapping plate 7 is rotated around a shaft O in the counterclockwise direction by means of a motor 7a connected to the shaft O, while the work member 6 is rotated in the counterclockwise direction by the rotation of the shaft 14 driven by the motor 14a. In this manner, the rail surfaces 2a and 2b are polished. During the lapping process, the sliders 1A rotationally slide on the lapping plate 7 so that the tapered portions 3a and 3b serve as the leading edges thereof, as shown in FIG. 4D. Although not shown, an abrasive liquid containing abrasive grains is introduced between the lapping plate 7 and the sliders 1A during the lapping process. In this manner, the rail surfaces 2a and 2b are polished, in the state where the sliders 1A are adhesively held by the rubber member 11, and rotated in a fixed revolution while the sliders 1A are pressed against the lapping plate 7 by means of the pressure member 12.

It should be noted that the rubber member 11 provides adhesive characteristics sufficient to prevent the sliders 1A from being displaced during the lapping process. When the sliders 1A are placed on the rubber member 11, the work member 6 is placed so that the rubber member 11 faces upwardly. Then, the work member 6 is turned upside down and placed on the lapping plate 7. The adhesion of the rubber member 11 functions to prevent the sliders 1A from dropping out of the rubber member 11 during the above turning process. By periodically cleaning the surface of the rubber member 11 by, for example, wiping off it with ethanol it is possible to prevent the adhesive characteristics of the rubber member 11 from decreasing. This means that the rubber member 11 can be used many times. Further, the rubber member 11 functions to uniformly apply a load of the pressure member 12 to the sliders 1A.

FIG. 5 shows a variation of the rubber member 11 shown in FIGS. 4A through 4C. A rubber member 11a shown in FIG. 5 has a disk shape. The rubber member 11a is fastened to the work member 6 by an adhesive. Alternatively, it is possible to flow a liquid rubber member on the work member 6 and form the rubber member 11a by a lining process. The functions of the rubber member 11a are the same as described above. Hence, it is possible to obtain a recession of a magnetic pole equal to or smaller than 20 nm.

It is preferable that the rubber member 11 having adhesive characteristics be made of silicon. The present invention uses elasticity of rubber and surface adhesion properties thereof. With the above in mind, it is possible to coat an adhesive material, such as silicon rubber, on a rubber which does not have significant adhesive characteristics.

Figure 6A:
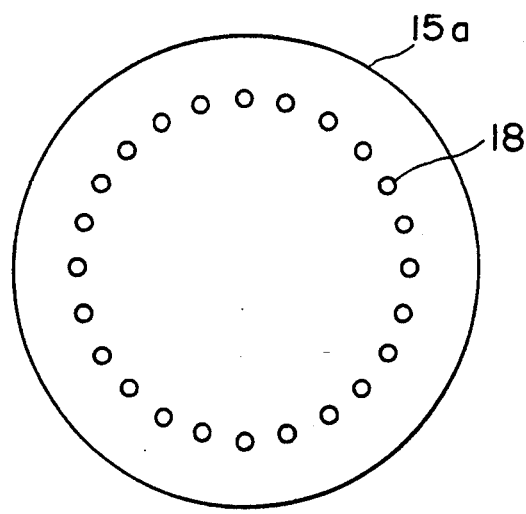
FIGS. 6A, 6B, 6C and 6D are diagrams showing a slider positioning member used in the first embodiment of the present invention.
Figure 6B:
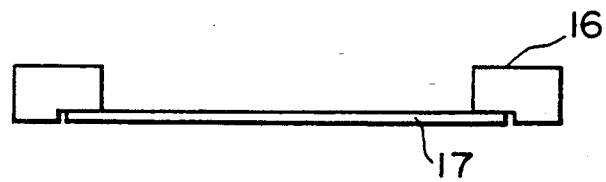
Figure 6C:
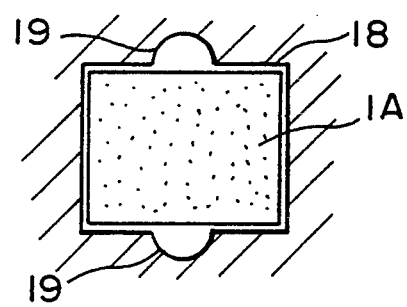
Figure 6D:
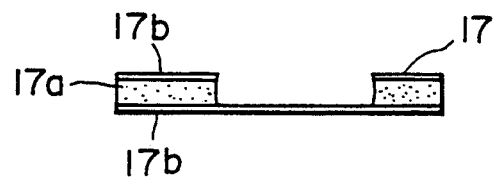
Figure 7A:
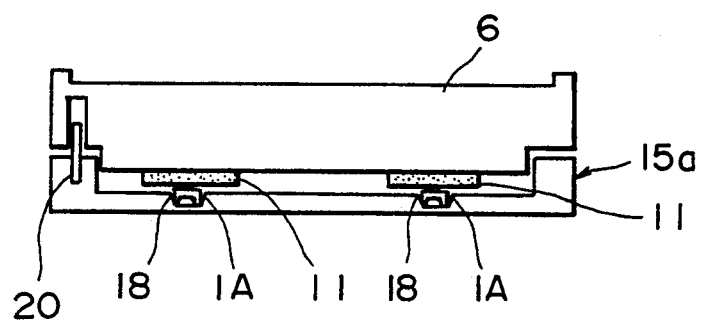
FIGS. 7A and 7B are diagrams showing a first process for positioning sliders.
Figure 7B:
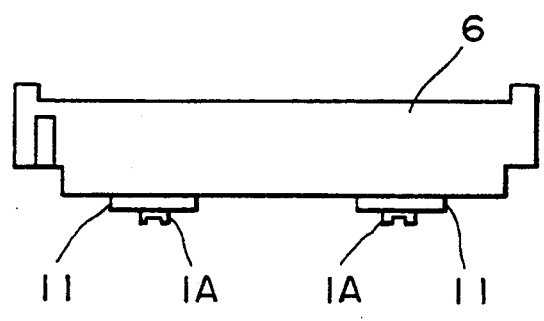

FIGS. 6A through 6D show a slider positioning member 15a, which is used for positioning the sliders 1A on the rubber member 11 (11a), as shown in FIGS. 7A and 7B. The slider positioning member 15a includes a disk-shaped thin plate 17, which is supported by a circular frame 16 shown in FIG. 6B. A plurality of holes 18 (24 holes, for example) are arranged in a circle at predetermined intervals equal to, for example, 15°, in the member 15a. As shown in FIG. 6C, each of the holes 18 formed in the plate 17 has a rectangular shape, and two opposite cutout portions 19 are formed in two opposing edges of each of the holes 18. The sliders 1A are respectively fitted into the holes 18 in such a manner that they can be held with a holding instrument, such as tweezers. During this operation, the ends of the tweezers are inserted into the cutout portions 19, and hence the slider positioning operation can be facilitated. As shown in FIG. 6D, the thin plate 17 is formed with a copper plate 17a having opposing surfaces plated with nickel layers 17b. The copper plate 17a and the nickel layers 17b are etched so that the holes 18 are formed.

As shown in FIG. 7A, the slider positioning member 15a is placed on the work member 6, and the sliders 1A are inserted into the holes 18 so that the back surfaces of the sliders 1A are attached to the rubber member 11, in other words, the rail surfaces 2a and 2b face downwardly. The slider positioning member 15a is positioned on the work member 6 by using a positioning pin 20, and hence the sliders 1A are circularly arranged on the rubber member 11 at predetermined intervals, as shown in FIG. 7B.

Figure 8A:
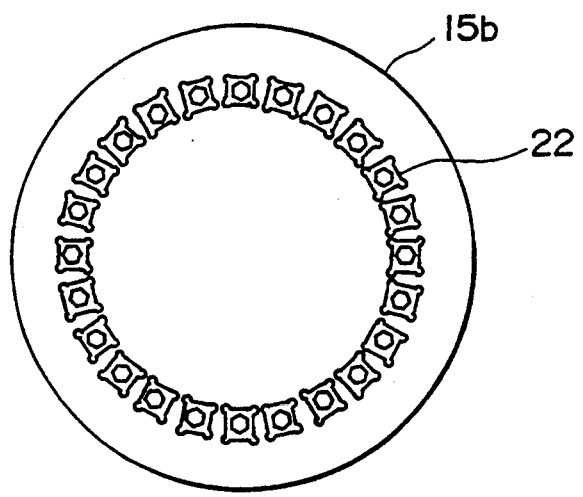
FIGS. 8A, 8B, 8C and 8D are diagrams showing a second process for positioning sliders.
Figure 8B:
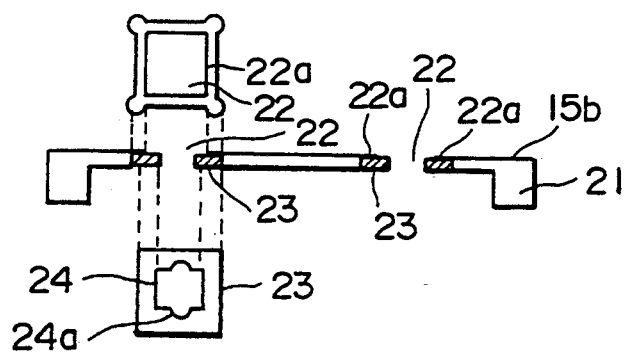

FIGS. 8A through 8D show a variation of the slider positioning member 15a. As shown in FIG. 8A, a slider positioning member 15b has a disk-shaped thin plate 21 having a frame portion. A plurality of holes 22 are arranged in a circle at predetermined intervals of 15°. As shown in FIG. 8B, a flange portion 22a is formed at each of the holes 22, and a flexible protection member 23 is fitted on the flange portion 22a of each of the holes 22. The protection member 23 has a hole in which two opposing cutout portions 24a are formed. The protection member 23 is formed with a polyimide plate or the like by press cutting.

Figure 8C:
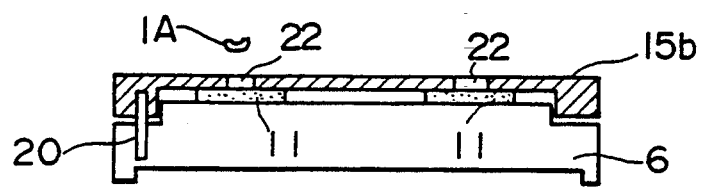
Figure 8D:
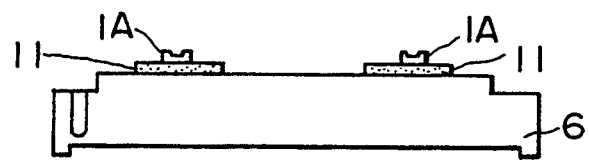

As shown in FIG. 8C, the slider positioning member 15b is on the work member 6 so that the rubber member 11 faces upwardly, the slider positioning member 15b being positioned thereon by means of the positioning pin 20. The holes 22 formed in the thin plate 21 are located on the rubber member 11. The sliders 1A are inserted into the holes 22 so that the back surfaces of the sliders 1A come into contact with the rubber member 11 and are pressed against the rubber member 11. Hence, the sliders 1A are attached to the rubber member due to adhesion thereof. During the lapping process, it is possible to leave the slider positioning member 15b on the work member 6 or remove it therefrom. The protection members 23 protect the sliders 1A from being damaged during the lapping process.

It will be noted that the protection members 23 can be applied to the slider positioning member 15a shown in FIGS. 6A through 6D.

Figure 1B:
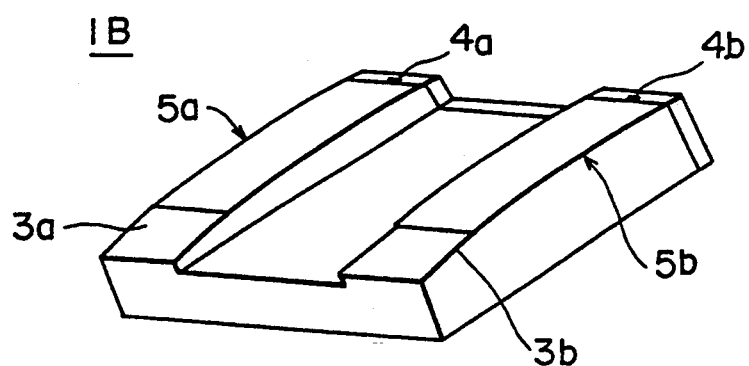
FIG. 1B is a perspective view of a second conventional magnetic head slider.
Figure 1C:
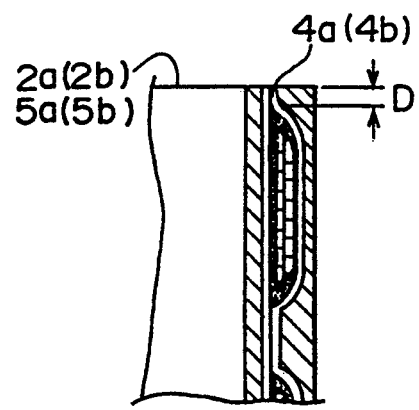
FIG. 1C is a cross-sectional view of a magnetic head.

According to the above-mentioned first embodiment, it is possible to precisely form the flat rail surfaces 2a and 2b of the sliders 1A (FIG. 1A) or crown-shaped surfaces 5a and 5b of the sliders 1B (FIG. 1B) having a slight crown quantity about 10 nm and keep recession of a magnetic pole equal to or smaller than 20 nm. Thereby, a large number of the sliders 1A can be produced at one time, and the production yield can be improved. As will be described later, it also is easy to obtain a desired gap depth D. Further, a uniform flying performance of the sliders 1A can be obtained.

Figure 9:
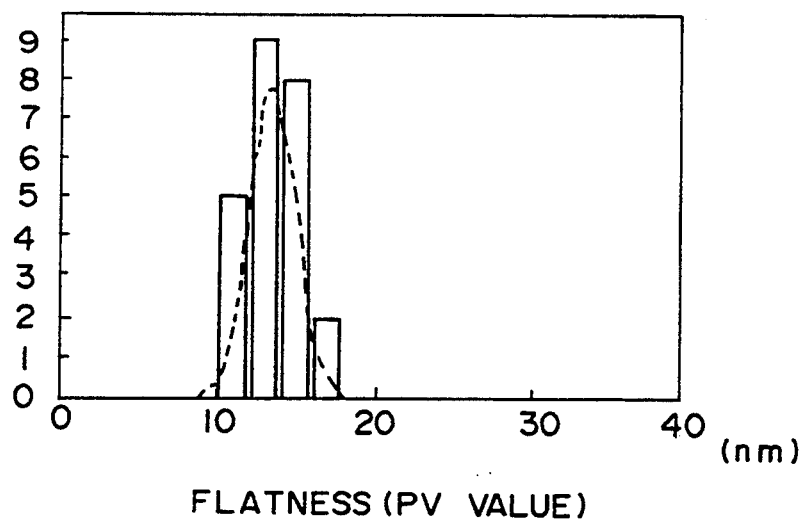
FIG. 9 is a graph showing flatness characteristics of the sliders obtained by the first embodiment of the present invention.
Figure 10A:
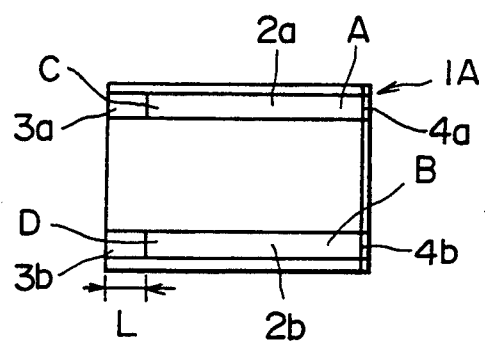
FIGS. 10A and 10B are diagrams showing the relationship between a processing quantity and the lengths of tapered portions of the sliders obtained by the first embodiment of the present invention.
Figure 10B:
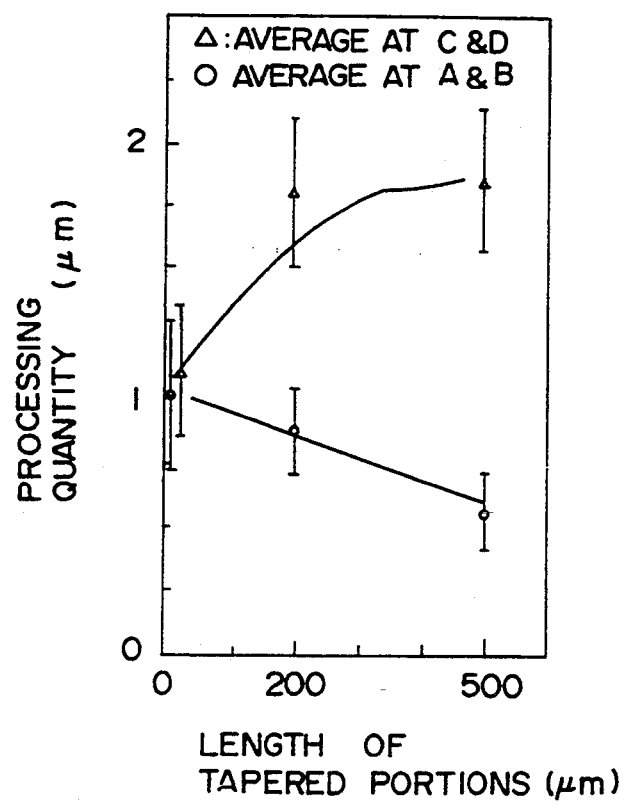

FIG. 9 is a graph showing flatness characteristics of 24 slider samples obtained by an experiment. The 24 samples have dimensions of 3.2 (length)×2.6 (width)×0.55 (height). As shown in FIG. 10A, each of the tapered portions 3a and 3b of each of the 24 samples has a length L equal to 500 μm. A lapping liquid (abrasive liquid) flows into the tapered portions 3a and 3b. FIG. 10B shows a polished length which varies as a function of the length L of each of the tapered portions 3a and 3b.

The flatness characteristics shown in FIG. 9 correspond to the difference of elevation regarding the rail surfaces 2a and 2b. The 24 samples have differences of elevation within a range of 10 to 16 nm. This shows that the rail surfaces 2a and 2b have been uniformly formed. In the experiment, the lapping lengths obtained at points A–D on the rail surfaces 2a and 2b shown in FIG. 10A were measured. FIG. 10B shows the average lapping lengths at the points A–D and their standard deviation values. In FIG. 10B, a triangular symbol indicates the average of the lapping lengths obtained at the points C and D, and a circular symbol indicates the average of the lapping lengths per minute obtained at the points A and B. The standard deviation value obtained on the lapping liquid inflow side is equal to or less than 0.01–0.02, and the standard deviation value obtained on the lapping liquid outflow side is also equal to or less that 0.01–0.02. This means that the samples have been uniformly reduced and that the gap depth D can be easily adjusted.

It can be seen from FIG. 10B that the lapping of the inflow-side portions of the rail surfaces 2a and 2b is increasingly facilitated as the lengths of the tapered portions 3a and 3b increase. This is because the lapping liquid flows into the tapered portions 3a and 3b as shown in FIG. 4D and hence the inflow-side portions of the rail surfaces 2a and 2b are shaved. With the above in mind, it is not desired that the sliders 1A be polished so that a desired gap depth D is obtained and thereafter the tapered portions 3a and 3b are further reduced so that the tapered portions 3a and 3b having decreased lengths are obtained. As a result, it is desired that the inflow-side portions of the rail surfaces 2a and 2b be shaved only a little during the lapping process. When the lengths of the tapered portions 3a and 3b are zero, a minimum of shaving can be obtained. When the tapered surfaces are polished so that the lapping process progresses from the side of the tapered portions 3a and 3b, a reduced recess quantity is obtained.

With the above in mind, the following two step lapping process can be performed. In the first step of the lapping process, the sliders 1A are positioned so that the trailing portions thereof having the magnetic heads 4a and 4b receive the lapping liquid, which liquid flows out of the tapered portions 3a and 3b. Since the trailing end portions of the sliders 1A and 1B having the magnetic heads 4 and 4b do not have any tapered portions, these trailing end portions are shaved only a little. The first step of the lapping process roughly levels the rail surfaces 2a and 2b of the sliders 1A. In the second step, the sliders 1A and 1B are oriented in the direction the reverse of that from which the tapered portions 3a and 3b receive the lapping liquid. By means of the second step, the rail surfaces 2a and 2b can be finely leveled, and the recession of magnetic poles can also be reduced. In this manner, it is possible to prevent the tapered portions 3a and 3b from being reduced during the lapping process. Hence, it is required that the tapered portions 3a and 3b have lengths slightly shorter than a desired length before the lapping process is carried out.

Figure 11A:
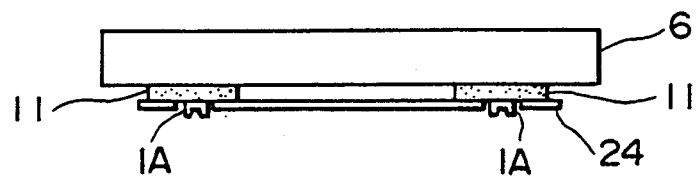
FIGS. 11A, 11B and 11C are diagrams showing a second embodiment of the present invention.
Figure 11B:
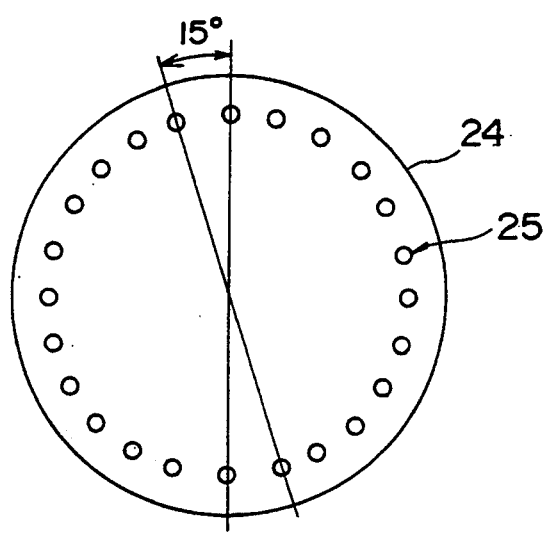
Figure 11C:
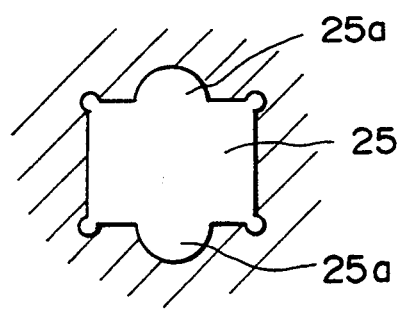

A description will now be given of a second embodiment of the present invention with reference to FIGS. 11A through 11C, in which parts which are the same as those shown in the previously described figures are given the same reference numerals. The sliders 1A are held by the rubber member 11 due to its adhesion, and are positioned by a slider holding plate 24. The slider holding plate 24 has a disk-shaped thin plate. As shown in FIG. 11B, a plurality of holes 25 are formed in the slider holding plate 24 so that they are circularly arranged at predetermined intervals. When 24 sliders are polished at one time, the holes 25 are arranged in a circle at angle intervals of 15°. As shown in FIG. 11C, each of the holes 25 has a rectangular shape corresponding to the shape of each slider 1A. Two opposite cutout portions 25a, which function in the same manner as the aforementioned cutout portions 19 and 24a, are formed in two opposite edges of each hole 25. The slider holding plate 24 is formed with, for example, a soft polyimide thin plate. The holes 25 can be formed by press cutting. It is easy to position the sliders 1A on the rubber member 11 by using the slider holding plate 24. It will be noted that the slider holding plate 24 has a thickness which allows the sliders 1A attached to the rubber member 11 to project from the slider holding plate 24.

When the sliders 1A are miniaturized, adhesion of rubber decreases and hence the sliders move during lapping. This movement of the sliders may damage the holding plate 24. In this regard, use of the slider holding plate 24 is very effective to prevents the sliders 1A from moving the lapping plate 7 from being damaged due o movement of the sliders 1A. The slider holding plate 24 also has the function of positioning the sliders 1A. Hence, the slider positioning members 15a and 15b are not needed in this process.

Figure 12A:
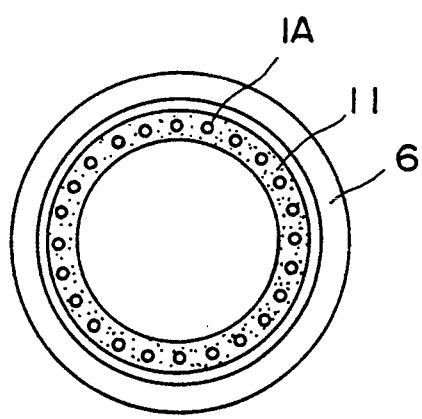
FIGS. 12A, 12B and 12C are diagrams showing a third embodiment of the present invention.
Figure 12B:
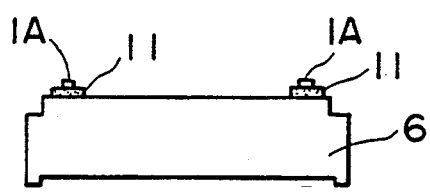
Figure 12C:
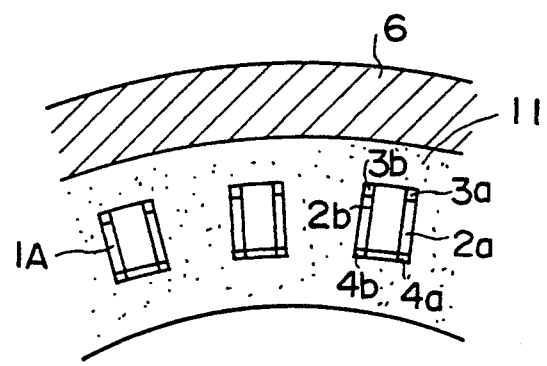

A description will now be given of a third embodiment of the present invention, with reference to FIGS. 12A through 12C, in which parts which are the same as those shown in the previously described figures are given the same reference numerals. The third embodiment of the present invention is intended to form crown-shaped rail surfaces 5a and 5b having a crown quantity larger than that obtained by the first and second embodiments of the present invention. As shown in FIGS. 12A and 12B, the sliders 1A are arranged in a circle on the rubber member 11 at predetermined intervals. As shown in FIG. 12C, the sliders 1A are oriented in a different manner from that in the case of the aforementioned first and second embodiments of the present invention. More specifically, as shown in FIG. 12C, the rail surfaces 2a and 2b extend in radial directions of the cylindrical work member 6, and the thin magnetic heads 4a and 4b are located in an inner circumferential portion of the ring-shaped rubber member 11.

This is because of the following. There is a relationship between the recess quantity and the orientation of the sliders 1A. When the magnetic heads 4a and 4b are located close to the outer circumference of the work member 6, the recess quantity obtained will increase. In this case, a recess quantity equal to 35–45 nm is obtained, while a recess quantity approximately equal 23 nm is obtained for the arrangement shown in FIG. 12C.

Figure 13A:
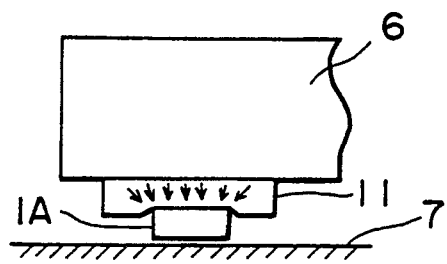
FIGS. 13A, 13B, 13C, 13D and 13E are diagrams showing how rail surfaces of a slider are formed into crown shapes according to the first and third embodiments of the present invention.
Figure 13B:
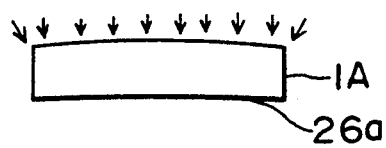

The forming of the crown-shaped rail surfaces 2a and 2b will now be described with reference to FIGS. 13A through 13E, in which the tapered portions 3a and 3b are omitted for the sake of simplicity. Referring to FIG. 13A, the sliders 1A having flat rail surfaces 2a and 2b are held by the rubber member 11 due to its adhesion. In this state, peripheral portions of the sliders 1A receive a pressure from the rubber member 11 which is greater than a pressure applied to inner portions of the sliders 1A. The pressure exerted on the peripheral portions of the sliders 1A is oriented inwardly. Hence, as shown in FIG. 13B, the sliders 1A are deformed, and the rail surfaces 2a and 2b are formed so that they have negative crown-shaped rail surfaces 5a and 5b.

Figure 13C:
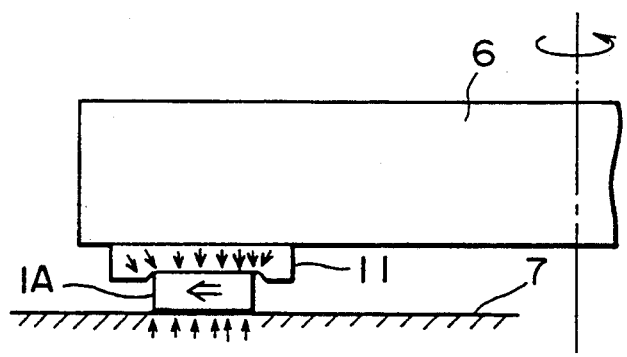
Figure 13D:
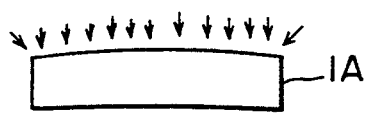
Figure 13E:

After the lapping process is completed, the pressure exerted by the rubber member 11 is stopped, and sliders each having a positive crown shape 26b are obtained, as shown in FIG. 13E, in which a slider having a positive crown shape 26b is indicated by the reference numeral 1B.

As shown in FIG. 13C, the work member 6 is rotated in the state in which the sliders 1A are oriented in radial directions as shown in FIG. 12C. A centrifugal force generated by the rotation of the work member 6 functions to cause the sliders 1A to move outwardly in the radial direction. Hence, the force applied from the rubber member 11 increases at outer portions of the sliders 1A. That is, the force exerted on the outer portions of the sliders 1A becomes greater than that exerted on the inner portions of the sliders 1A. As a result, the peripheral portions of the sliders 1A are polished more than the inner portions thereof. In this manner, the flat rail surfaces are formed into identical crown shapes greater than those obtained by the first embodiment of the present invention, as shown in FIG. 13D.

Figure 2:
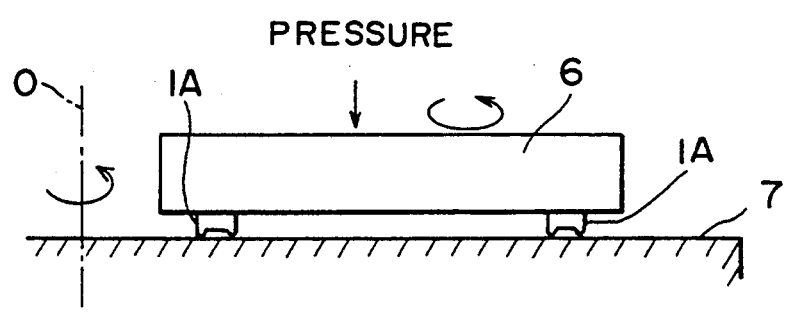
FIG. 2 is a cross-sectional view of a conventional process for forming flat rail surfaces of sliders.
Figure 14:
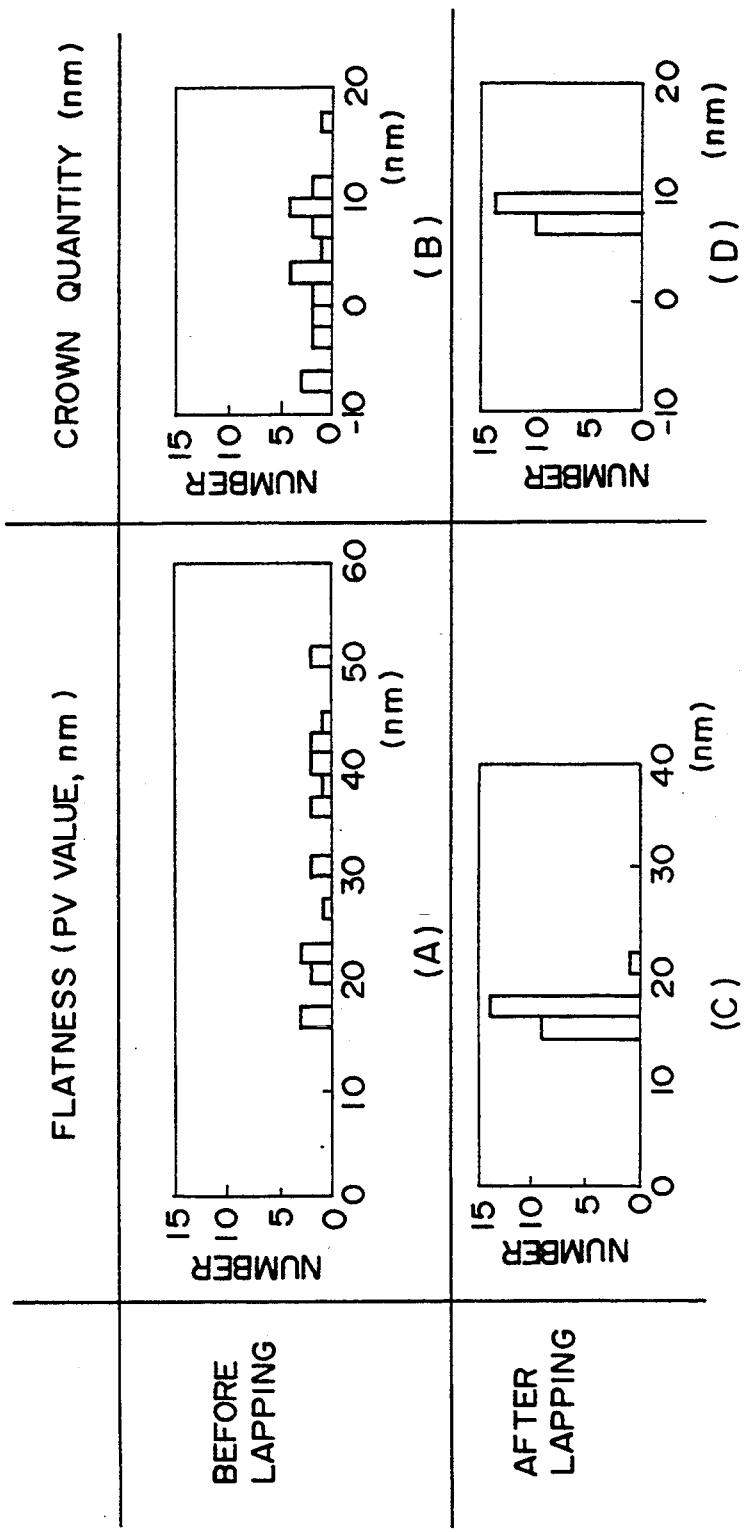
FIG. 14 is a diagram showing experimental results.

FIG. 14 shows the experimental results regarding the first embodiment of the present invention. Graphs (A) and (B) respectively show the flatness of slider samples which were polished by the conventional method shown in FIGS. 2 and 3, and the crown quantity thereof. In the graph (A) of FIG. 14, the flatness of the samples is expressed by the average of the peak-to-valley values of the rail surfaces obtained by the conventional leveling process shown in FIG. 2. In the graph. (B) of FIG. 14, the crown quantity is expressed by the average of the heights of the highest points of the rail surfaces obtained by the conventional lapping process. Graphs (C) and (D) respectively show the flatness of slider samples which were polished by the first embodiment of the present invention shown in FIGS. 4A through 4C.

The slider samples used in the experiments had dimensions of 3.2 mm (length)×2.6 mm (width) and 0.55 mm (height), and the length of each of the tapered portions 3a and 3b was 500 μm. The lapping process was continuously carried out for 1-2 minutes. The lapping plate 7 was made of tin.

It can be seen from the graphs (A) and (B) of FIG. 14 that the flatness values of the rail surfaces are dispersed over a wide range and that the crown quantities thereof are also dispersed over a wide range. On the other hand, as shown in the graphs (C) and (D) of FIG. 14, through the first embodiment of the present invention uniform flatness and uniform crown shape can be obtained. According to the present invention, it is expected that approximately 500 sliders can be polished per hour per person. On the other hand, according to the prior art, approximately 20 sliders could be polished per hour while forming them with poor crown shapes.

Figure 3:
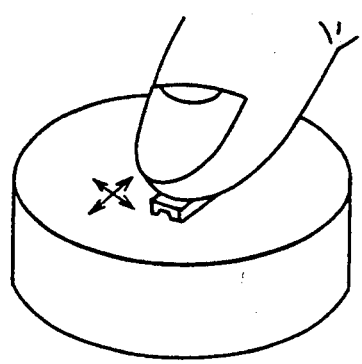
FIG. 3 is a perspective view of a conventional process for forming flat rail surfaces of sliders.

FIGS. 15A and 15B are diagrams of sliders polished by the conventional lapping process shown in FIG. 3. FIGS. 15C and 15D are diagrams of sliders polished by the first embodiment of the present invention shown in FIGS. 12A through 12C. It can be seen from the FIGS. 15C and 15D that slider surfaces having almost identical crown shapes are formed.

A description will now be given of the influence of various parameters upon the lapping process of the present invention. In order to consider the influence of the parameters upon the lapping process, the following standard lapping condition is defined:
Abrasive grains: natural diamond,
Grain size: ¼ μm,
Weight: 6 kg/cm$^2$, Lapping time: 3 minutes
Revolution of the lapping plate 7: 5 rpm,
Revolution of the work member 6: 10 rpm,
Thickness of the rubber member: 2 mm.

Figure 16A:
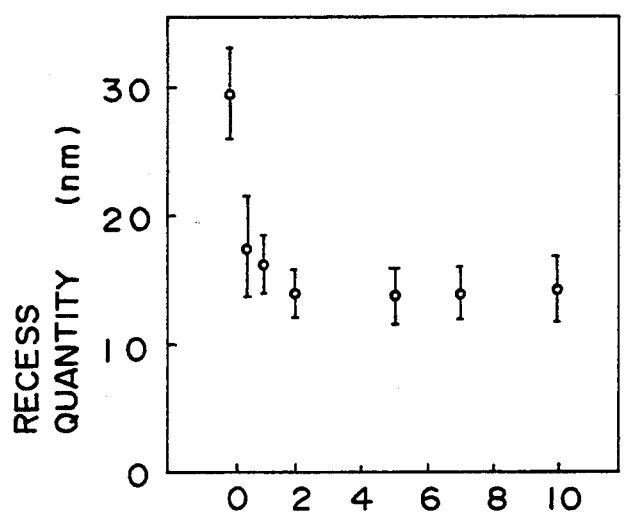
FIGS. 16A, 16B, 17, 18A, 18B, 19A, 19B, 19C, 20A and 20B are diagrams showing other experimental results.
Figure 16B:
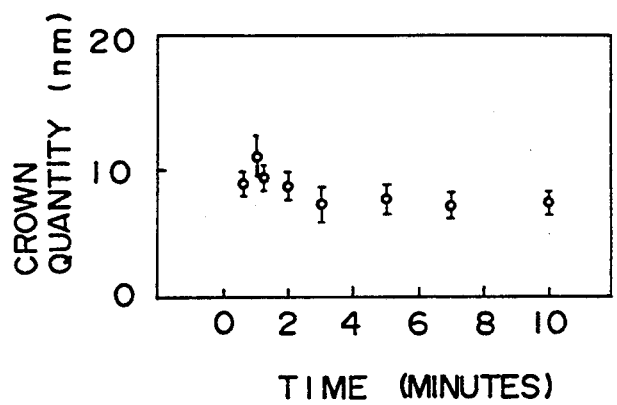

FIGS. 16A and 16B show the time dependence of he lapping process. It can be seen from FIGS. 16A and 16B that the finishing effects of the lapping process can be obtained with a lapping time of 30 seconds. After the 30-second lapping process, the recess quantity of the magnetic pole portion is reduced to 20 nm or less, and the crown quantity is increased to approximately 10 nm. It will be noted that most of the finishing effects of lapping can be obtained within a range of 30 seconds to 10 minutes. This means that the lapping process of the present invention does not depend greatly on the lapping time.

Figure 17:
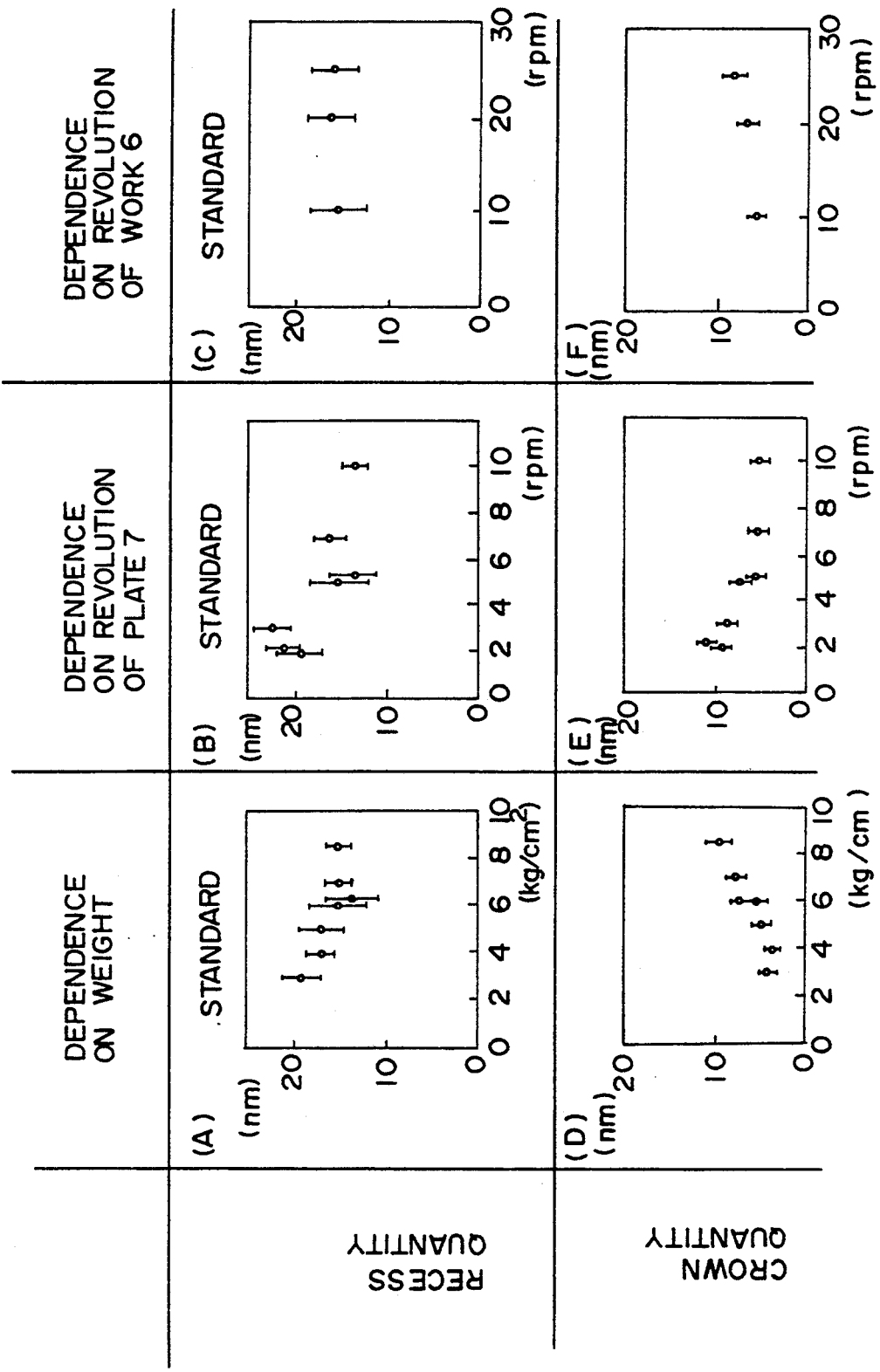

FIG. 17 shows the dependence of the lapping process on weight, the revolution of the lapping plate 7, and the revolution of the work member 6. As shown in graphs (A) and (D] of FIG. 17, as the weight increases, the crown quantity increases and the recess quantity decreases. As shown in graphs (B) and (E), both the recess quantity and crown quantity increase as the revolution of the lapping plate 7 decreases. The reason why the recess quantity increases as the revolution of the lapping plate 7 decreases is considered to be as follows. That is, the sliders 1A move slowly at an outer circumferential portion of the lapping plate 7 and hence lapping particles easily abrade the magnetic poles. The reason why the crown quantity increases as the revolution of the lapping plate 7 decreases is considered to be as follows. That is, the lapping movement is mainly based on the autorotation movement of the slider holding plate 24, and thus the lapping liquid can function effectively. As shown in graphs (C) and (F), the revolution of the work member 6 (slider holding plate 24) does not influence the recess quantity and the crown quantity.

Figure 18A:
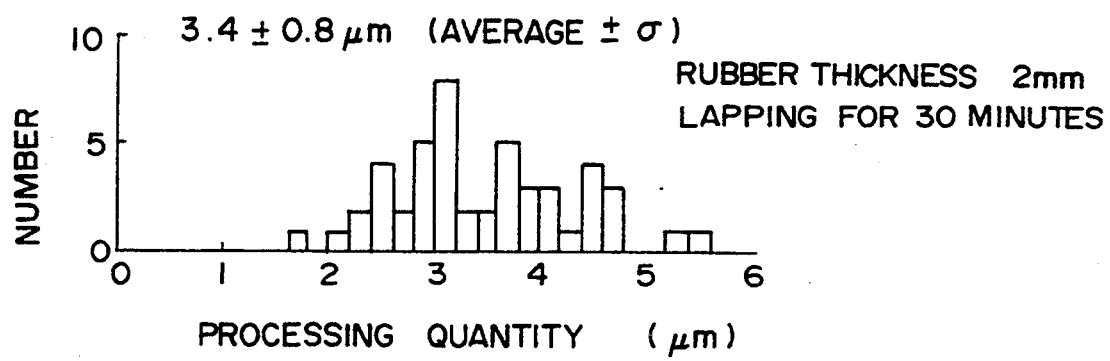
Figure 18B:
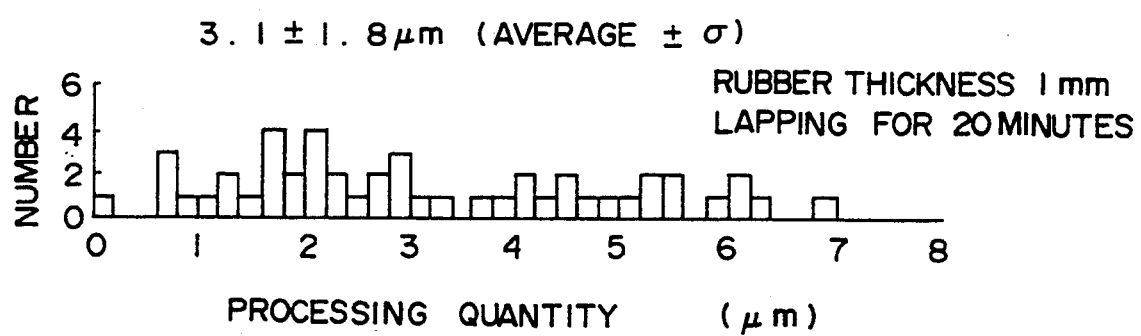

FIGS. 18A and 18B show the dependence of the lapping process on the thickness of the rubber member 11. A plurality of rubber members 11 each having a thickness of 2 mm (FIG. 18A), and a plurality of rubber members 11 each having a thickness of 1 mm (FIG. 18B) were examined. Each of the rubber members 11 was flat within 10 μm. The quantity of lapping was obtained by from the thickness of the sliders by using an instrument (Heidenhein having a resolution of 0.1 μm). That is, the difference between the thickness of each of the samples was measured at a point in the vicinity of the lapping liquid inflow end. It can be seen from FIGS. 18A and 18B that the rubber members 11, each having a thickness of 2 mm, are better than the rubber members 11 each having a thickness of 1 mm. The rubber members 11 each having a thickness of 2 mm have a rigidity less than those each having a thickness of 1 mm, and apply a weight uniform to the sliders 1A.

Figure 19A:
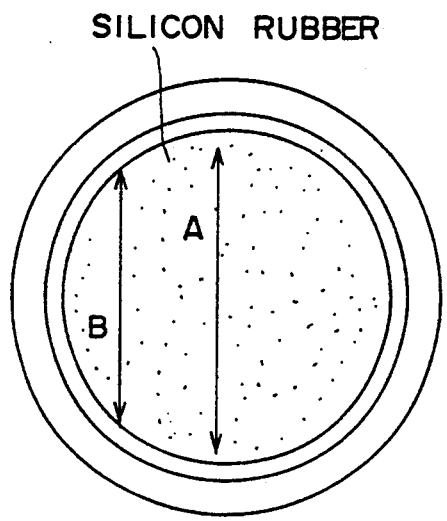
Figure 19B:
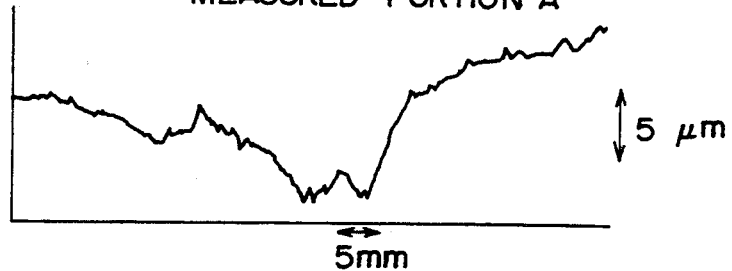
Figure 19C:
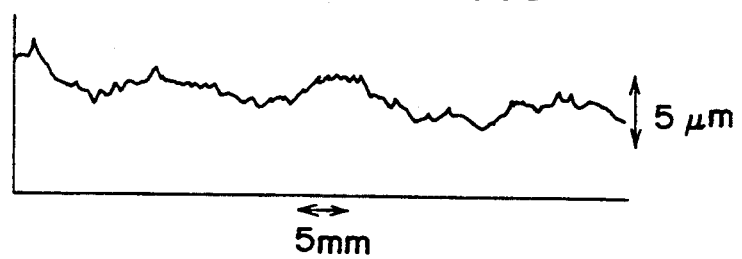

FIGS. 19A, 19B and 19C show characteristics of the rubber members used in the present invention. In order to hold a large number of sliders on the rubber member due to its adhesion, it is preferable that the rubber members be made of silicon rubber, which has good adhesion properties. For example, silicon rubber having a rigidity of 50° and a thickness of 2 mm is used.

The spring rigidity of the rubber was measured by applying a pressure to the sliders placed on the rubber member by means of a weight (an optical flat member) and obtaining the relationship between the quantity of caving on the rubber member and the weight. The quantity of caving on the rubber member having a thickness of 2 mm was equal to 15–20 μm for the standard weight equal to 6 kg/cm$^2$. The rubber member was fastened to the slider holding plate, and finished by paper finishing and mechanical lapping so that flatness within 10 μm could be obtained. FIG. 19B shows the flatness of the above rubber member measured immediately after the mechanical lapping and FIG. 19C shows the flatness thereof measured after the rubber member had been used 100 times. It can be seen from FIGS. 19B and 19C that the flatness of the rubber member can be maintained even after the rubber member has been used repeatedly 100 times.

Figure 20A:
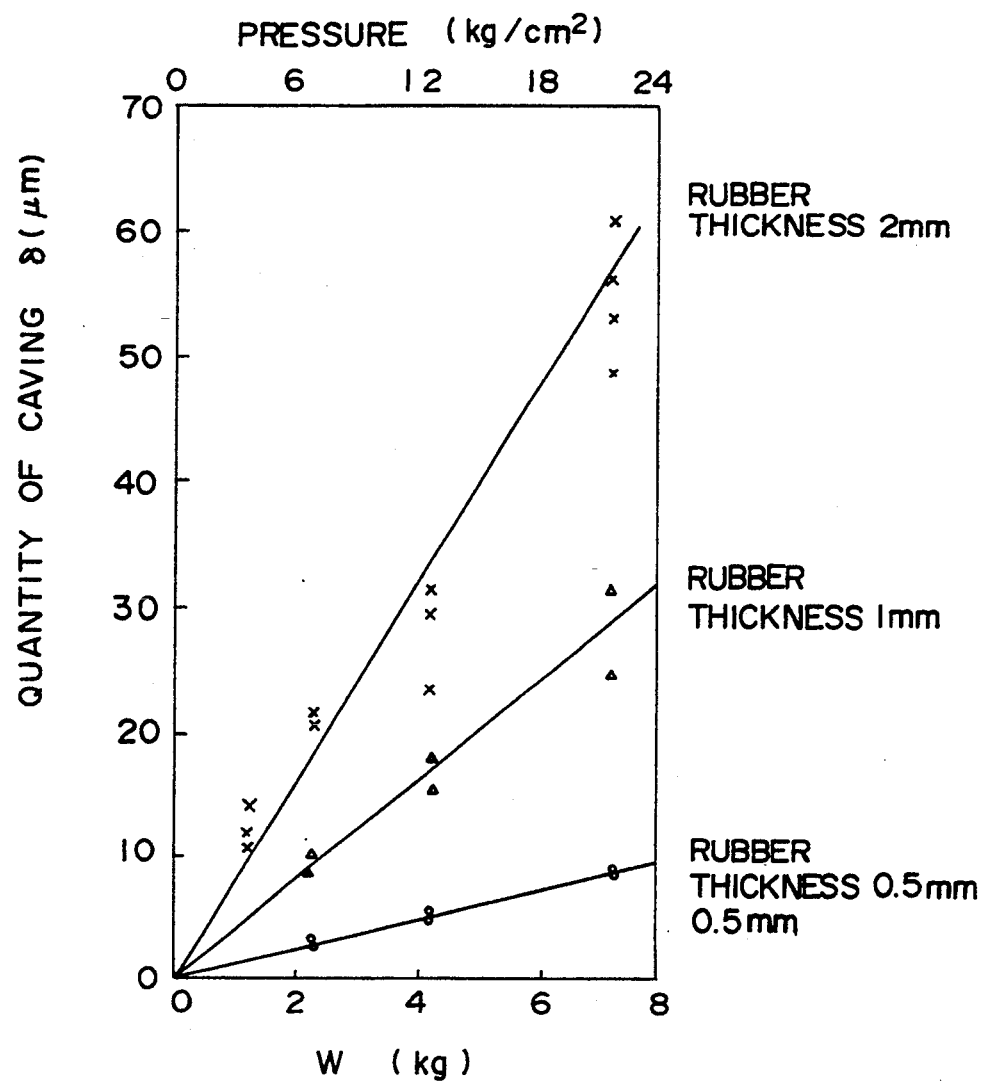
Figure 20B:
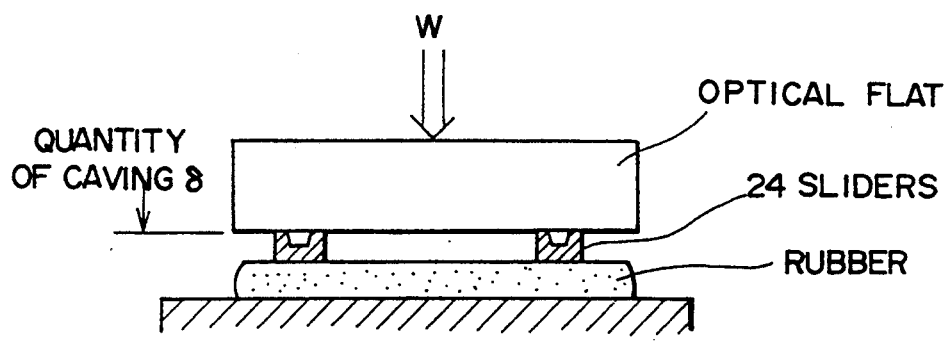

FIG. 20A shows the relationship between the quantity of caving on the rubber members and the weight applied to an optical flat member (weight), as shown in FIG. 20B.

A description will now be given of a fourth embodiment of the present invention with reference to FIGS.

21A through 21C, in which parts which are the same as those shown in the previously described figures are given the same reference numerals from figure to figure. As shown in FIG. 21A, the fourth embodiment of the present invention includes a first temperature adjustment unit 27 and a second temperature adjustment unit 28. The first temperature adjustment unit 27 regulates the temperature of the work member 6 and thus of the rubber member 11. The second temperature adjustment unit 28 regulates the temperature of the lapping plate 7. The first and second temperature adjustment units 27 and 28 are controlled so that the temperatures of the sliders 1A are higher than the temperature of the lapping plate 7. Alternatively, it is possible to control, without the second temperature adjustment unit 28, the temperatures of the sliders 1A so that they become higher than room temperature by the first temperature adjustment unit 27. It is also possible to use only the second temperature adjustment unit 28. Further, it is possible to heat the rubber member 11 and cool the lapping plate 7.

When the temperature of the rubber member 11 is different from that of the lapping plate 7, a thermal deformation is caused in the sliders 1A so that a negative crown shape 26 is obtained in which peripheral portions thereof project, as shown in FIG. 21B. During the lapping process, these projections are polished. After the lapping process is completed and the temperature difference is canceled, each slider 1A has a positive crown shape 26b.

Figure 22:
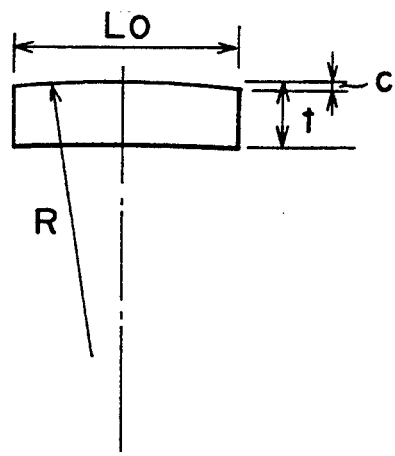
FIG. 22 is a diagram showing a crown quantity caused by a thermal deformation.

The crown quantity caused by thermal deformation will be described with reference to FIG. 22. If the temperatures of the opposite surfaces of the slider 1A having a thickness t differ from each other, a deformation $\epsilon$ is caused between the opposite surfaces, and the slider 1A is deformed with a radius of curvature $(=1/\epsilon)$. A crown quantity C is defined as follows:

$$C \approx Lo^2/8R = Lo^2 \cdot \epsilon/8t \quad (1)$$

where Lo is the length of the slider 1A.

In the case where the slider 1A is made of $Ai_2O_3 \cdot TiC$ (coefficient of thermal expansion: $7.9 \times 10^{-6}$) and has dimensions such that the thickness t is 0.55 mm and the length is 3 mm, the deformation $\epsilon = 7.9 \times 10^{-6}$ is generated between the opposite surfaces of the slider 1A. Thus, the radius of curvature R is approximately equal to 70 mm, and the crown quantity is equal to 16 nm. As a result, it becomes possible to form desired crown shapes of the rail surfaces at a temperature difference equal to only 1° C.

Figure 23:
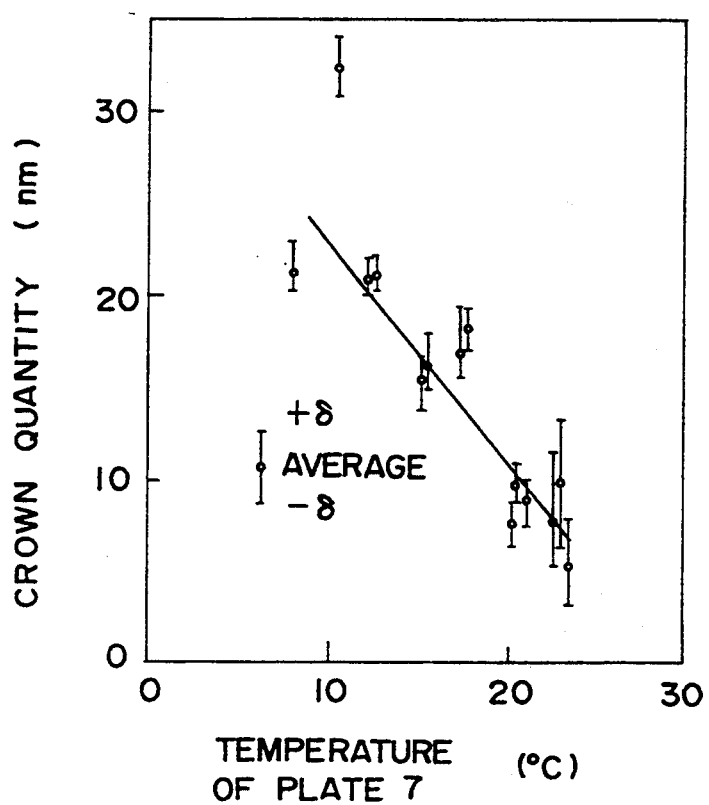
FIG. 23 is a graph showing experimental results regarding the fourth embodiment of the present invention.

FIG. 23 is a graph showing the relationship between the crown quantity and the temperature of the lapping plate 7. The crown quantity corresponds to the difference between the average level at the points C and D and the average level at the points A and B shown in FIG. 10B. As the temperature of the lapping plate 7 decreases, the crown quantity decreases. It can be seen from FIG. 23 that the dispersion of the crown quantity obtained at each measurement temperature of the lapping plate 7 is effectively suppressed. The crown quantity obtained is equal to or less than 10 nm at room temperature and approximately equal to 20 nm at a temperature of between 10°–15° C. Under the above-mentioned condition, the recess quantity was equal to or less than 20 nm.

The composite functions of the deformation of the rubber member 11 and the temperature control makes it possible to obtain a large crown quantity.

It is preferable that the rubber member 11 used in the fourth embodiment of the present invention be made of a material having a good thermal conductivity in order to produce the respectively different temperatures of the opposite surfaces of the sliders 1A. For example, the rubber member 11 may be made of silicon rubber with alumite added thereto. The silicon rubber with alumite added thereto has a thermal conductivity which is several times to tens of times that of silicon rubber containing no alumite. Instead of alumite, SiC can be added to silicon rubber.

The sliders 1A and 1B are made of, for example, ferrite, which has a thermal conductivity of 21.0w/m·deg, and silicon rubber, which has a terminal conductivity of 0.2w/m·deg. The terminal conductivity of the silicon rubber is much smaller than that of the slider. Hence, the quantity of heat passing through the slider due to the difference in temperature between the lapping plate 7 and the rubber member 11 is mainly based on the thermal conductivity of the rubber member 11. Hence, the quantity of heat passing through the slider 1A increases as the coefficient of the thermal expansion of the rubber member 11 increases, and the difference between the temperatures of the opposite surfaces of the slider 1A increases. In this manner, a large crown quantity can be obtained.

Figure 24A:
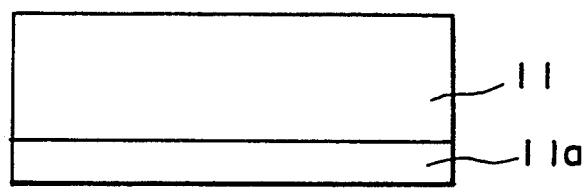
FIGS. 24A and 24B are diagrams of variations of a rubber member used in the fourth embodiment of the present invention.
Figure 24B:
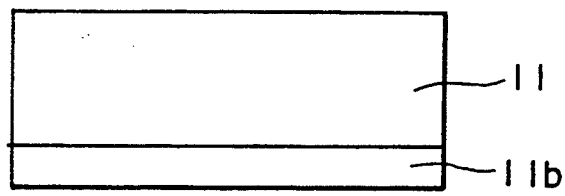

The rubber member containing an additive may have a degraded softness. In this case, as shown in FIG. 24A, it is possible to stack a rubber member 11a on the rubber member 11 containing a conductive additive. As shown in FIG. 24B, it is also possible to stack a cohesive layer 11b on the rubber member 11 containing a conductive additive.

Figure 25A:
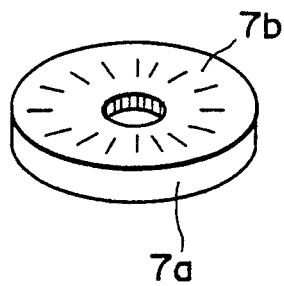
FIGS. 25A, 25B, 25C and 25D are diagrams showing a fifth embodiment of the present invention.
Figure 25B:
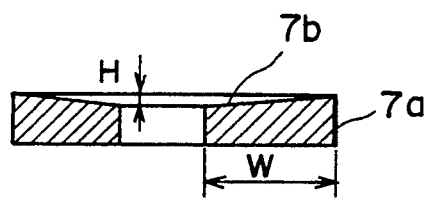
Figure 25C:
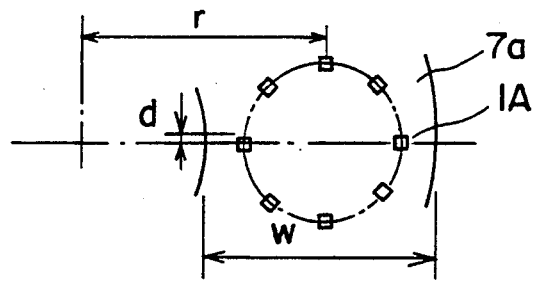

A description will now be given of a fifth embodiment of the present invention with reference to FIGS. 25A through 25D. The fifth embodiment of the present invention uses a ring-shaped lapping plate 7a having a recessed lapping surface 7b inclined inwardly, as shown in FIGS. 25A and 25B. The lapping plate 7a makes it possible to form large crown quantities on the rail surfaces of the sliders. The lapping surface 7b of the lapping plate 7a is a part of a conical surface.

The rail surfaces of the sliders 1A are made to slide on the conical lapping surface 7b of the lapping plate 7a during the lapping process. Thus, a positive crown surface is formed on each of the rail surfaces of the sliders 1A. It is possible to adjust the crown quantities of the rail surfaces by varying the inclination of the lapping surface 7b.

Figure 25D:
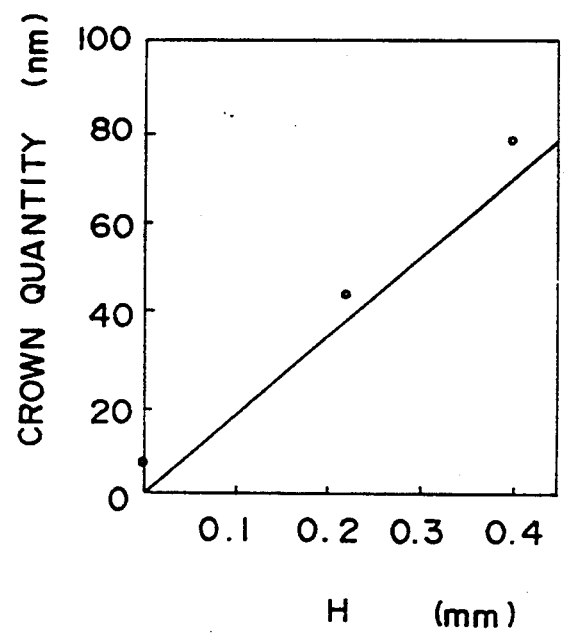

A crown quantity C formed by the conical lapping surface 7b is obtained as follows, taking into account a geometrical considerations:

$$C = (d^2 \cdot H)/2Wr \quad (2)$$

where W denotes the width of the lapping surface 7b (FIG. 25B), H denotes the difference between the height of the outermost end of the lapping plate 7a and that of the innermost end thereof (FIG. 25B), r is the distance between the center of the lapping plate 7a and the axis of rotational motion of the slider 1A (FIG. 25C), and d is half the length of the slider 1A (FIG. 25D). When d=1.6 mm, r=70 mm, and W=100 mm, the crown quantity C defined by the formula (2) changes as a function of the difference H, as shown in FIG. 25D. It can be seen from FIG. 25D that the crown quantity increases as the difference H increases. That is, the crown quantity can be controlled by adjusting the difference H between the height of the outermost end of the lapping plate 7a and that of the innermost end thereof.

It will be noted that the lapping surface 7b is not limited to a conical surface. In principle, a curved lapping surface, such as a parabolic surface or a spherical surface, can be used.

Figure 26A:
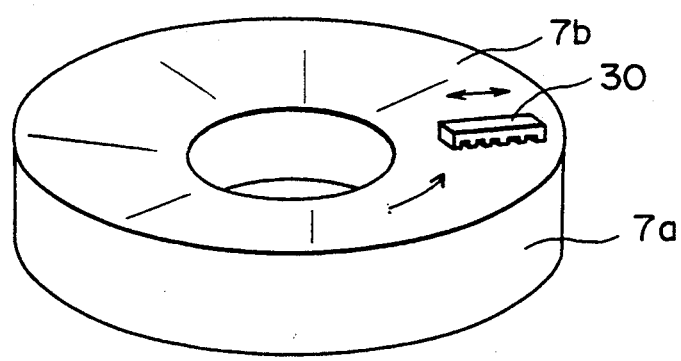
FIGS. 26A and 26B are diagrams showing a sixth embodiment of the present invention.
Figure 26B:
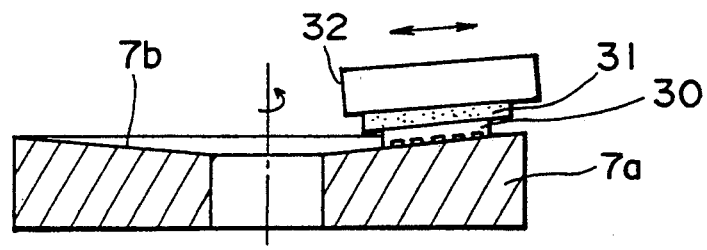

A description will now be given of a sixth embodiment of the present invention. FIG. 26A shows an overview of the sixth embodiment of the present invention. In FIG. 26A, parts which are the same as those shown in the previously described figures are given the same reference numerals. A slider block 30, which includes a plurality of sliders formed integrally with each other, is made to reciprocally slide on the lapping surface 7b of the lapping plate 7a in the radial direction of the lapping plate 7a. By cutting the slider block 30, the individual sliders can be obtained. A back surface of the slider block 30 is held by a rubber member 31 (FIG. 5) due to its adhesion. The rubber member 31 is fastened to a work member 32. During the lapping process, the lapping plate 7a is rotated, in the same manner as in the case of the aforementioned embodiments of the present invention, while the slider block 30 is reciprocally moved in the radials=direction. The slider block 30 is positioned with respect to the lapping surface 7b so that the slider surfaces are oriented in a direction approximately perpendicular to the radial direction.

Figure 27A:
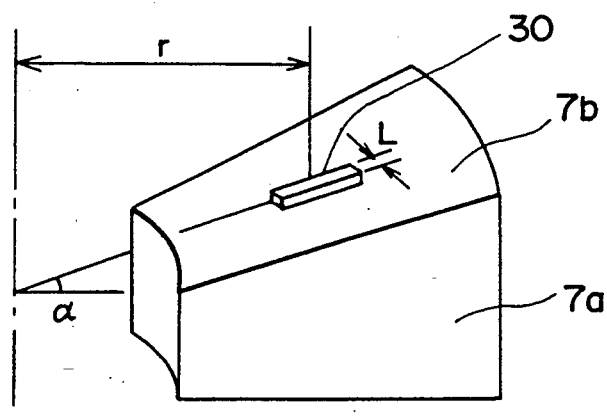
FIGS. 27A and 27B are diagrams showing the geometrical relationships between a conical lapping surface and a slider block.

The crown quantity C defined by the formula (2) can be rewritten as follows, taking into account geometrical considerations shown in FIG. 27A:

$$C = \alpha \cdot r(\sqrt{1 + L^2/4r} - 1) = \alpha L^2/8r \quad (3)$$

where $\alpha$ denotes an inclination of the lapping surface 7b, r denotes the distance between the axis of the ring-shaped lapping plate and the slider block 30, and L denotes the length of the rail surface. The length L is equal to twice the aforementioned length d.

Figure 26C:
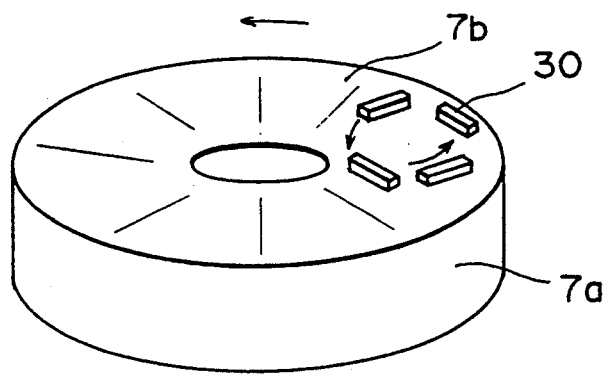
FIG. 26C is a diagram showing a variation of the sixth embodiment of the present invention.
Figure 27B:
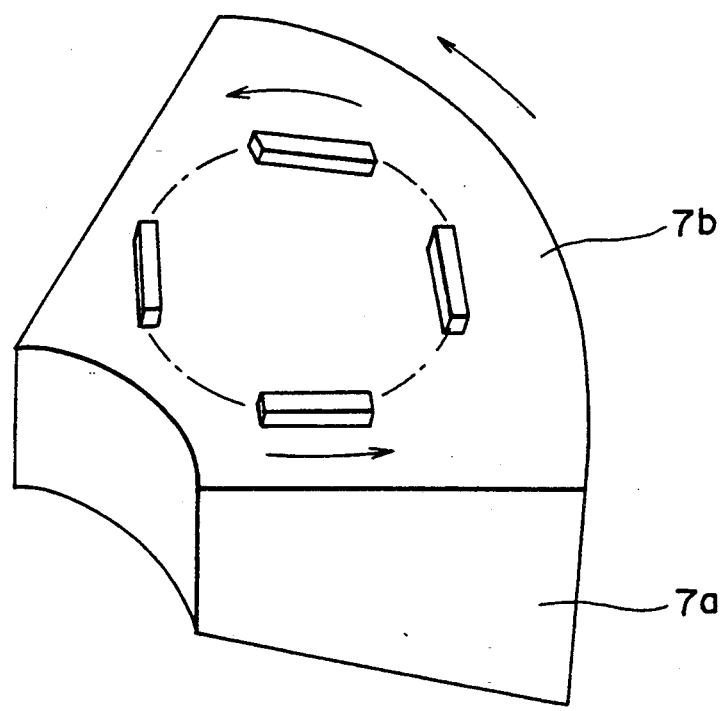

As shown in FIGS. 26C and 27B, it is possible to rotate the slider block 30 on the lapping surface 7a. The crown quantity C obtained in this case can be defined by the formula (3). In FIG. 27B, the slider block 30 is made to circularly slide on the lapping surface 7b in the counterclockwise direction, and the lapping plate 7a is rotated in the counterclockwise direction.

Figure 28A:
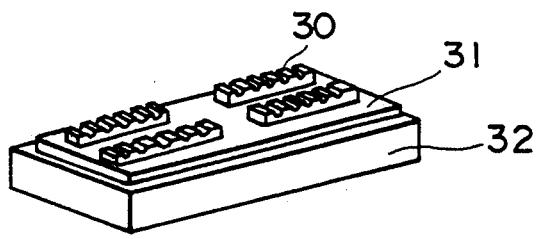
FIGS. 28A and 28B are diagrams showing the sixth embodiment of the present invention in more detail.

Referring to FIG. 28A, a plurality of slider blocks 30 are held by the rubber member 31 having a rectangular shape. The rubber member 31 is fastened to the work member 32. The slider blocks 30 are located so that they are oriented in a direction approximately perpendicular to the radial direction of the lapping plate 7a.

Figure 28B:
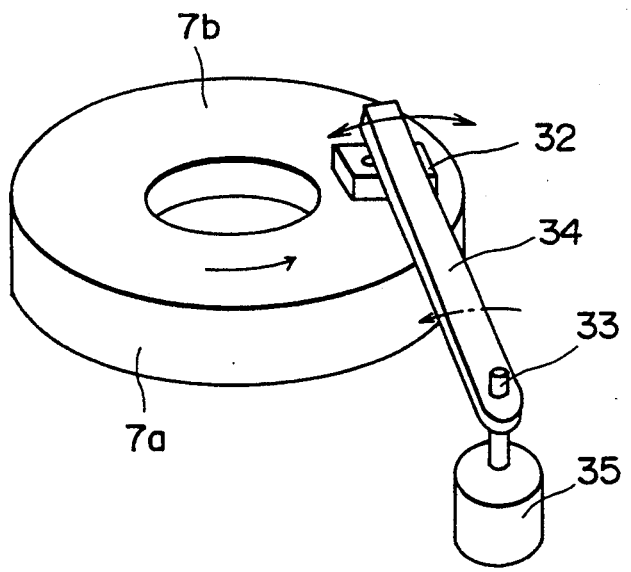

Referring to FIG. 28B, the back surface of the work member 32 is held by an arm 34, which is reciprocally pivoted by a motor 35. The slider blocks 30 are placed on the lapping surface 7a so that the rail surfaces of the integrally formed sliders are oriented in the direction approximately perpendicular to the radial direction of the ring-shaped lapping plate 7a. The arm 34 is reciprocally pivoted and hence the slider blocks 30 reciprocally slide on the lapping surface 7b. Strictly speaking, the slider blocks 30 can be moved in an arc. However, by using the arm 34 having a long length, the slider blocks 30 move approximately linearly. During the lapping process, the lapping plate 7a is rotated by a motor (not shown).

15–20 nm crown shapes were obtained under the following conditions:
Length of arm 34: 700 mm,
External radius of the lapping plate 7a: 400 mm,
Internal radius of the lapping plate 7a: 80 mm,
Difference H: 200 μm,
Inclination: $1.25 \times 10^{-3}$,
Abrasive grains: natural diamond,
Grain size: ¼ μm
Length L of each slider block 30: 3 mm,
Thickness of the rubber member 31: 3 mm,
Pressure applied to the rubber member 31: 1–3 kg/cm$^2$,
The processing quantity: 0.2 μm or less,
The lapping speed: 5 cm/minute (at maximum),
Lapping movement: 30 mm per stroke, and
Number of times that the work member 32 is reciprocally moved: 100 times.

Since the rubber member 32 is soft, it can absorb differences between the thicknesses of the slider blocks 30. Hence, it is possible to uniformly form the rail surfaces of the sliders of the slider blocks 30.

Figure 29:
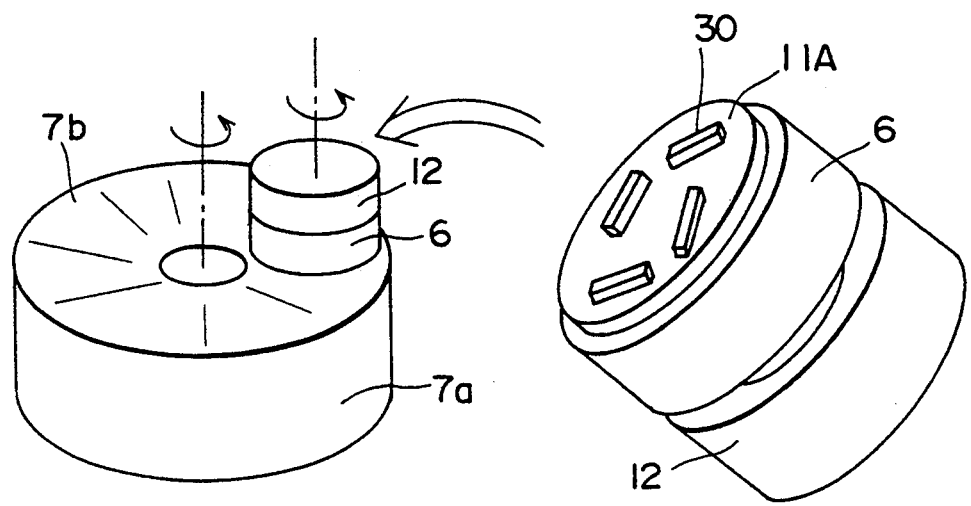
FIG. 29 is a diagram showing the variation of the sixth embodiment in more detail.

FIG. 29 is a diagram showing an apparatus in which a plurality of slider blocks 30 are held by the disk-shaped rubber member 11A (FIG. 5), and placed on the lapping surface 7b of the lapping plate 7a. The slider blocks 30 are oriented so that the rail surfaces thereof are substantially oriented in the radial direction. The cylindrical work member 6 is rotated in the counterclockwise direction, while the lapping plate 7b is also rotated in the same direction as the work member 6. Due to the flexibility of rubber, the blocks are free to deformed in their long-side direction along the curved lapping surface of the lapping plate 7b it is possible to prevent processing from concentrating on peripheral portions of the blocks and prevent the blocks from being shaped into crown shapes in their long-side direction. Thus, it is difficult for the crown shapes to be formed in the long-side directions of the slider blocks. On the other hand, it is difficult for the slider blocks 30 to be deformed in their short-side direction. Hence, the rail surfaces oriented in the short-side directions are easily formed into the crown shapes.

15–20 nm crown shapes were obtained under the following conditions:
External radius of the lapping plate 7a: 400 mm,
Internal radius of the lapping plate 7a: 80 mm,
Difference H: 200 μm,
Inclination: $1.25 \times 10^{-3}$,
Thickness of the rubber member 31: 5 mm,
Pressure applied to the rubber member 31: 4–8 kg/cm$^2$,
Revolution of the lapping plate 7a: 5 rpm,
Revolution of the work member 6: 10 rpm
The processing quantity: 0.1 μm or less,
Abrasive grains: natural diamond,
Grain size: ¼μm,
The interval between the opposite slider blocks 30: 30–40 mm, and
Length of each block 30: 25 mm.

It is also possible to use an arbitrary elastic member instead of the rubber member. Such an elastic member is required to hold sliders or slider blocks due to its adhesion.

The present invention is not limited to the specifically disclosed embodiments, and variations and modifications may be made without departing from the scope of the present invention.

What is claimed is:

1. A magnetic head slider producing apparatus comprising:
   a rotary lapping member having a lapping surface;
   a work member having a surface; and
   an elastic member fastened to the surface of the work member, said elastic member being formed of a rubber compound having adhesive characteristics,
   magnetic head sliders each having a back surface, and rail surfaces in which magnetic heads are embedded,
   the back surface of each of the magnetic head sliders being in contact with the elastic member, and the magnetic head sliders being adhesively held by the rubber elastic member in a dry state, and
   the work member being positioned so that only the rail surface of each of the magnetic head sliders comes into contact with the lapping surface of the rotary lapping member.

2. A magnetic head slider producing apparatus as claimed in claim 1, wherein:
   the magnetic head slider producing apparatus further comprises a slider positioning member placed on the elastic member;
   the slider positioning member has a plate shape;
   said slider positioning member includes a plurality of holes; and
   the magnetic head sliders are respectively fitted into the holes, so that the magnetic head sliders are positioned on the elastic member.

3. A magnetic head slider producing apparatus as claimed in claim 2, wherein the holes are arranged in a circle in the elastic member so that the magnetic head sliders are also arranged in a circle.

4. A magnetic head slider producing apparatus as claimed in claim 3, wherein the holes are arranged at predetermined intervals so that the magnetic head sliders are arranged in the predetermined intervals.

5. A magnetic head slider producing apparatus as claimed in claim 2, wherein the slider positioning member has protection members respectively provided for the holes so that the magnetic head sliders come in contact with the protection members when the magnetic head sliders are fitted into the holes to be prevented from directly coming into contact with edges of the holes.

6. A magnetic head slider producing apparatus as claimed in claim 2, wherein the slider positioning member is removed before lapping.

7. A magnetic head slider producing apparatus as claimed in claim 2, wherein the slider positioning member is left on the elastic member during lapping.

8. A magnetic head slider producing apparatus as claimed in claim 1, wherein the rubber compound comprises silicon rubber.

9. A magnetic head slider producing apparatus as claimed in claim 1, wherein said magnetic head slider producing apparatus further comprises rotating means for rotating the work member.

10. A magnetic head slider producing apparatus as claimed in claim 10, wherein the magnetic head sliders are positioned on the lapping surface of the rotary lapping member so that the rail surfaces of the magnetic head sliders are oriented in a radial direction of the rotary lapping member.

11. A magnetic head slider producing apparatus as claimed in claim 10, wherein the magnetic head sliders are positioned on the lapping surface of the rotary lapping member so that the magnetic heads embedded in end portions of the rail surfaces are closer to an inner portion of the lapping surface than an outer portion thereof.

12. A magnetic head slider producing apparatus as claimed in claim 9, wherein the magnetic head sliders are positioned on the lapping surface of the rotary lapping member so that the rail surfaces of the magnetic head sliders are oriented in a rotating direction of the work member.

13. A magnetic head slider producing apparatus as claimed in claim 12, wherein the magnetic head sliders are positioned on the lapping surface of the rotary lapping member so that ends of the rail surfaces in which the magnetic heads are embedded are leading ends during motion of the head sliders in a rotating direction of the work member.

14. A magnetic head slider producing apparatus as claimed in claim 9, wherein the magnetic head sliders are positioned on the lapping surface of the rotary lapping member so that ends of the rail surfaces in which the magnetic heads are embedded are trailing ends during motion of the magnetic head sliders in a rotating direction of the work member.

15. A magnetic head slider producing apparatus as claimed in claim 1, wherein the elastic member has a ring shape.

16. A magnetic head slider producing apparatus as claimed in claim 1, wherein the elastic member has a disk shape.

17. A magnetic head slider producing apparatus as claimed in claim 1, wherein the elastic member has a rectangular shape.

18. A magnetic head slider producing apparatus as claimed in claim 1, wherein the magnetic head slider producing apparatus further comprises temperature adjustment means for controlling temperatures of the elastic member and the lapping member so that a difference between the temperature of the elastic member and that of the lapping member is obtained.

19. A magnetic head slider producing apparatus as claimed in claim 19, wherein the elastic member contains a material having enough thermal conductivity to cause the difference between the temperature of the elastic member and that of the lapping member.

20. A magnetic head slider producing apparatus as claimed in claim 18, wherein:
   the elastic member comprises a first rubber member and a second member having enough thermal conductivity to cause the difference between the temperature of the elastic member and that of the lapping member;
   the first rubber member includes a material having enough thermal conductivity to cause the difference between the temperature of the elastic member and that of the lapping member; and
   the second member is stacked on the first rubber member and fastened to the surface of the work member.

21. A magnetic head slider producing apparatus as claimed in claim 1, wherein the lapping surface of the lapping member comprises a level surface.

22. A magnetic head slider producing apparatus as claimed in claim 1, wherein the lapping surface of the lapping member comprises a curved surface.

23. A magnetic head slider producing apparatus as claimed in claim 1, wherein the lapping surface of the lapping member comprises an inclined flat surface which is inclined downwardly toward an inner portion of the lapping member.

24. A magnetic head slider producing apparatus as claimed in claim 1, wherein the lapping surface of the lapping member comprises a conical surface which is inclined downwardly toward an inner portion of the lapping member.

25. A magnetic head slider producing apparatus as claimed in claim 1, wherein the magnetic head slider producing apparatus further comprises means for reciprocally moving the work member in a radial direction of the rotary lapping member.

26. A magnetic head slider producing apparatus as claimed in claim 25, wherein the rail surfaces of the magnetic head sliders are oriented in a direction approximately perpendicular to the radial direction.

27. A magnetic head slider producing apparatus as claimed in claim 1, wherein the magnetic head sliders are magnetic head sliders separated from each other.

28. A magnetic head slider producing apparatus as claimed in claim 1, wherein the magnetic head sliders are contained in a block in which the magnetic head sliders are formed integrally.

29. A magnetic head slider producing apparatus as claimed in claim 28, wherein:
the magnetic head slider producing apparatus further comprises means for reciprocally moving the work member in a radial direction of the rotary lapping member; and
said block is positioned on the lapping surface of the lapping member so that the rail surfaces of the magnetic head sliders contained in the block are oriented in a direction approximately perpendicular to the radial direction thereof.

30. A magnetic head slider producing apparatus as claimed in claim 28, wherein:
said magnetic head slider producing apparatus further comprises rotating means for rotating the work member; and
said block is positioned on the lapping surface of the lapping member so that the rail surfaces of the magnetic head sliders contained in the block are oriented in a direction approximately perpendicular to a direction in which the work member is rotated.

31. A magnetic head slider producing apparatus as claimed in claim 1, wherein:
each of the magnetic head sliders is contained in one of a plurality of blocks; and
some of the magnetic head sliders are formed integrally in each of the blocks.

32. A magnetic head slider producing apparatus as claimed in claim 31, wherein:
the magnetic head slider producing apparatus further comprises means for reciprocally moving the work member in a radial direction of the rotary lapping member; and
said blocks are positioned on the lapping surface of the lapping member so that the rail surfaces of the magnetic head sliders contained in the blocks are oriented in a direction approximately perpendicular to the radial direction thereof.

33. A magnetic head slider producing apparatus as claimed in claim 31, wherein:
said magnetic head slider producing apparatus further comprises rotating means for rotating the work member; and
said blocks are positioned on the lapping surface of the lapping member so that the rail surfaces of the magnetic head sliders contained in the blocks are oriented in a direction approximately perpendicular to a direction in which the work member is rotated.

34. A magnetic head slider producing apparatus, comprising:
a rotary lapping member having a lapping surface;
a work member having a surface; and
an elastic member fastened to the surface of the work member, said elastic member comprising a rubber material on which another rubber material having adhesive characteristics is coated,
magnetic head sliders each having a back surface, and rail surfaces in which magnetic heads are embedded,
the back surface of each of the magnetic head sliders being in contact with the elastic member, and the magnetic head sliders being adhesively held by the elastic member, and
the work member being positioned so that only the rail surface of each of the magnetic head sliders comes into contact with the lapping surface of the rotary lapping member.

35. A magnetic head slider producing method comprising the steps of:
(a) rotating a rotary lapping member having a lapping surface;
(b) rotating a work member having a surface, wherein:
an elastic member is fastened to the surface of the work member, and has adhesive characteristics;
magnetic head sliders each have a back surface, and rail surfaces in which magnetic heads are embedded;
the back surface of each of the magnetic head sliders is in contact with the elastic member;
the magnetic head sliders are adhesively held by the elastic member; and
the work member is positioned so that only the rail surface of each of the magnetic head sliders comes into contact with the lapping surface of the rotary lapping member.

36. A magnetic head slider producing method as claimed in claim 35, wherein:
the magnetic head slider producing method comprises the step of (c) positioning the magnetic head sliders by a slider positioning member placed on the elastic member, the slider positioning member having a plate shape and a plurality of holes; and
the step (c) comprises the step of fitting the magnetic head sliders into the holes, so that the magnetic head sliders are positioned on the elastic member.

37. A magnetic head slider producing method as claimed in claim 36, wherein the holes are arranged in a circle in the elastic member so that the magnetic head sliders are also arranged in a circle.

38. A magnetic head slider producing method as claimed in claim 37, wherein the holes are arranged at predetermined intervals so that the magnetic head sliders are arranged at the predetermined intervals.

39. A magnetic head slider producing method as claimed in claim 36, wherein the slider positioning member has protection members respectively provided for the holes so that the magnetic head sliders come in contact with the protection members when the magnetic head sliders are fitted into the holes to be prevented from directly coming into contact with edges of the holes.

40. A magnetic head slider producing method as claimed in claim 36, wherein the magnetic head slider producing method further comprises the step of (d) removing the slider positioning member from the elastic member before lapping.

41. A magnetic head slider producing method as claimed in claim 35, wherein:
the step (b) comprises the step of rotating the lapping member; and
the magnetic head slider producing method comprises the step of (c) positioning the magnetic head sliders on the lapping surface of the rotary lapping member so that the rail surfaces of the magnetic head sliders are oriented in a radial direction of the rotary lapping member.

42. A magnetic head slider producing method as claimed in claim 41, wherein the magnetic head slider producing method further comprises the step of (d) positioning the magnetic head sliders on the lapping surface of the rotary lapping member so that the magnetic heads embedded in ends of the rail surfaces are closer to an inner portion of the lapping surface than an outer portion thereof.

43. A magnetic head slider producing method as claimed in claim 35, wherein:
the step (b) comprises the step of rotating the work member; and
the magnetic head slider producing method comprises the step of (c) positioning the magnetic head sliders on the lapping surface of the rotary lapping member so that the rail surfaces of the magnetic head sliders are oriented in a rotating direction of the work member.

44. A magnetic head slider producing method as claimed in claim 35, wherein:
the step (b) comprises the step of rotating the lapping member; and
the magnetic head slider producing method comprises the step of (c) positioning the magnetic head sliders on the lapping surface of the rotary lapping member so that ends of the rail surfaces in which the magnetic heads are embedded are trailing ends in a rotating direction of the work member.

45. A magnetic head slider producing method as claimed in claim 35, wherein:
the step (b) comprises the step of rotating the lapping member; and
the magnetic head slider producing method comprises the step of (c) positioning the magnetic head sliders on the lapping surface of the rotary lapping member so that ends of the rail surfaces in which the magnetic heads are embedded are leading ends in a rotating direction of the work member.

46. A magnetic head slider producing method as claimed in claim 35, wherein the magnetic head slider producing method further comprises the step of (c) controlling temperatures of the elastic member and the lapping member so that a difference between the temperature of the elastic member and that of the lapping member is obtained.

47. A magnetic head slider producing method as claimed in claim 35, wherein the step (b) comprises the step of reciprocally moving the work member in a radial direction of the rotary lapping member.

48. A magnetic head slider producing method as claimed in claim 47, wherein the magnetic head slider producing method comprises the step of positioning the magnetic head sliders so that the rail surfaces of the magnetic head sliders are oriented in a direction approximately perpendicular to the radial direction.

49. A magnetic head slider producing method as claimed in claim 35, wherein the magnetic head sliders are separated from each other.

50. A magnetic head slider producing method as claimed in claim 35, wherein the magnetic head sliders are contained in a block in which the magnetic head sliders are formed integrally.

51. A magnetic head slider producing method as claimed in claim 50, wherein the magnetic head slider producing method further comprises the steps of
reciprocally moving the work member in a radial direction of the rotary lapping member; and
positioning said block on the lapping surface of the lapping member so that the rail surfaces of the magnetic head sliders contained in the block are oriented in a direction approximately perpendicular to the radial direction.

52. A magnetic head slider producing method as claimed in claim 50, wherein said magnetic head slider producing method further comprises the steps of:
rotating the work member; and
positioning said block on the lapping surface of the lapping member so that the rail surfaces of the magnetic head sliders contained in the block are oriented in a direction approximately perpendicular to a direction in which the work member is rotated.

53. A magnetic head slider producing method as claimed in claim 35, wherein:
each of the magnetic head sliders is contained in one of a plurality of blocks; and
some of the magnetic head sliders are formed integrally in each of the blocks.

54. A magnetic head slider producing method as claimed in claim 53, wherein the magnetic head slider producing method further comprises the steps of:
reciprocally moving the work member in a radial direction of the rotary lapping member; and
positioning said blocks on the lapping surface of the lapping member so that the rail surfaces of the magnetic head sliders contained in the blocks are oriented in a direction approximately perpendicular to the radial direction.

55. A magnetic head slider producing method as claimed in claim 53, wherein said magnetic head slider producing method further comprises the steps of:
rotating the work member; and
positioning said blocks on the lapping surface of the lapping member so that the rail surfaces of the magnetic head sliders contained in the blocks are oriented in a direction approximately perpendicular to a direction in which the work member is rotated.

56. A magnetic head slider producing method as claimed in claim 35, wherein:
the step (b) comprises the step of rotating the lapping member; and
wherein the magnetic head slider producing method comprises the steps of:
(c-1) positioning the magnetic head sliders on the lapping surface of the rotary lapping member so that ends of the rail surfaces in which the magnetic heads are embedded are leading ends in a rotating direction of the work member; and (c-2) positioning, after the step (c-1), the magnetic head sliders on the lapping surface of the rotary lapping member so that the ends of the rail surfaces in which the magnetic heads are embedded are trailing ends in the rotating direction of the work member.

57. A magnetic head slider producing method as claimed in claim 35, wherein the lapping surface of the lapping member comprises a level surface.

58. A magnetic head slider producing method as claimed in claim 35, wherein the lapping surface of the lapping member comprises a curved surface.

59. A magnetic head slider producing method as claimed in claim 35, wherein the lapping surface of the lapping member comprises an inclined flat surface which is inclined downwardly toward an inner portion of the lapping member.

60. A magnetic head slider producing method as claimed in claim 35, wherein the lapping surface of the lapping member comprises a conical surface which is inclined downwardly toward an inner portion of the lapping member.

61. A magnetic head slider producing method as claimed in claim 35, wherein the elastic member comprises a rubber on which another rubber having adhesive characteristics is coated.

* * * * *